United States Patent
Kazama et al.

(10) Patent No.: US 6,167,863 B1
(45) Date of Patent: *Jan. 2, 2001

(54) ENGINE WITH TORQUE CONTROL

(75) Inventors: Isamu Kazama, Kanagawa; Masayuki Yasuoka, Yokohama; Hiroshi Iwano, Kanagawa; Takahiro Yoshino, Yokohama, all of (JP)

(73) Assignee: Nissan Motor Co., Ltd., Yokohama (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/089,367

(22) Filed: Jun. 3, 1998

(30) Foreign Application Priority Data

Jun. 3, 1997 (JP) .................................................. 9-144918
Jul. 3, 1997 (JP) .................................................. 9-178278
Jul. 25, 1997 (JP) .................................................. 9-200430

(51) Int. Cl.$^7$ ............................ F02B 17/00; F02D 41/14
(52) U.S. Cl. ........................ 123/295; 123/305; 123/399; 123/478; 123/568.21
(58) Field of Search .................................... 123/295, 305, 123/399, 478, 480, 568.21

(56) References Cited

U.S. PATENT DOCUMENTS

| 5,931,138 | 8/1999 | Uchida | 123/436 |
| 5,960,765 | 10/1999 | Iida et al. | 123/295 |
| 5,988,141 | 11/1999 | Uchida | 123/436 |

FOREIGN PATENT DOCUMENTS

| 882877 | * 12/1998 | (EP) | 123/295 |
| 62-110536 | 5/1987 | (JP) . | |
| 5-248277 | * 9/1993 | (JP) . | |
| 9-287513 | * 11 1997 | (JP) . | |
| WO 96/36802 | 11/1996 | (WO) . | |

OTHER PUBLICATIONS

Patent Abstracts of Japan, vol. 017, No. 392 (Jul. 22 1993), abstract of JP-05-071381.

Patent Abstracts of Japan, vol. 013, No. 041 (Jan. 01 1989), abstract of JP-63-248938.

* cited by examiner

Primary Examiner—Tony M. Argenbright
(74) Attorney, Agent, or Firm—Foley & Lardner

(57) ABSTRACT

An engine comprising a throttle controller operable in response to an intake air control command, a fuel controller operable in response to a fuel control command, and an engine controller for generating the intake air control command and the fuel control command. The engine controller determines a target equivalence ratio for detected operating state of the engine, controls a change between stratified charge combustion and homogeneous charge combustion, delays the target equivalent ratio, determines the intake air control command and the fuel control command in response to the delayed target equivalence ratio.

32 Claims, 21 Drawing Sheets

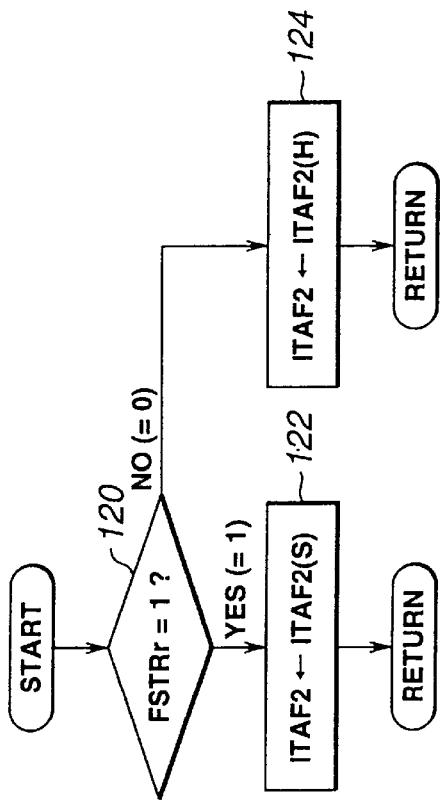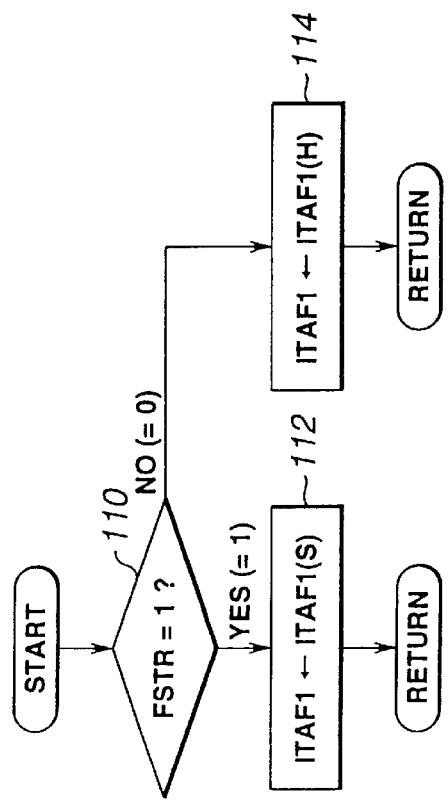

(LESS PREFERRED EMBODIMENT)

ENGINE WITH TORQUE CONTROL

FIELD OF THE INVENTION

The present invention relates to an engine with torque control.

BACKGROUND OF THE INVENTION

JP-A 62-110536 discloses a torque control technique for an internal combustion engine. According to this technique, a target throttle position or opening degree is determined after a retrieval operation based on a target engine torque and the engine speed. This technique proves to be effective in operating the engine at a predetermined air fuel ratio such as the stoichiometry.

It would be desirable to employ a control scheme in which an engine operates at air fuel ratio that varies with varying operating states. The above-mentioned technique does not meet demands imposed on the control scheme.

This is because the control scheme requires a technique to alter air fuel ratio with the engine operating performance, i.e., engine speed and torque, unaltered. Both a change in the engine throttle position and a change in fuel supply quantity are requested to occur concurrently to accomplish this task. For example, to alter air fuel ratio toward the lean side from the stoichiometry, it is requested that intake air quantity increases, while fuel supply quantity decreases.

SUMMARY OF THE INVENTION

According to one aspect of the present invention, there is provided an engine comprising:

a combustion chamber;

an air intake passageway leading toward the combustion chamber;

a throttle valve within the air intake passageway;

a fuel injector communicating with the combustion chamber;

a throttle controller operable in response to an intake air control command to move the throttle valve;

a fuel controller operable in response to a fuel control command to open the fuel injector for injection of fuel into the combustion chamber; and an engine controller for generating the intake air control command and the fuel control command, said engine controller being operable to determine a target equivalence ratio for detected operating state of the engine, the engine controller being operable to control a change between stratified charge combustion and homogeneous charge combustion, the engine controller being operable to delay the target equivalence ratio, and the engine controller being operable to determine the fuel control command in response to the delayed target equivalence ratio.

According to another aspect of the present invention, there is provided a control system for an internal combustion engine operable on stratified charge combustion or homogeneous charge combustion, comprising:

a basic target equivalent ratio generator for generating a basic target equivalent ratio for detected operating state of the engine;

a transfer operable to delay the basic target equivalence ratio;

a provisional target equivalence ratio generator for generating a provisional target equivalence ratio as determined as a function of the delayed basic target equivalent ratio that was determined during the previous operation cycle;

a comparator for determining whether or not a change between stratified charge combustion and homogeneous charge combustion has occurred based on the provisional target equivalence ratio; and a target equivalence ratio generator for generating a target equivalence ratio for the current operation cycle in response to the result of determination whether or not change between stratified charge combustion and homogeneous charge combustion has occurred.

BRIEF DESCRIPTION OF THE DRAWINGS

FIGS. 7(A) and 7(B) are flow charts of control routines performed at first and second combustion efficiency generators 68 and 70, respectively.

DESCRIPTION OF THE PREFERRED EMBODIMENTS

Figure 1:
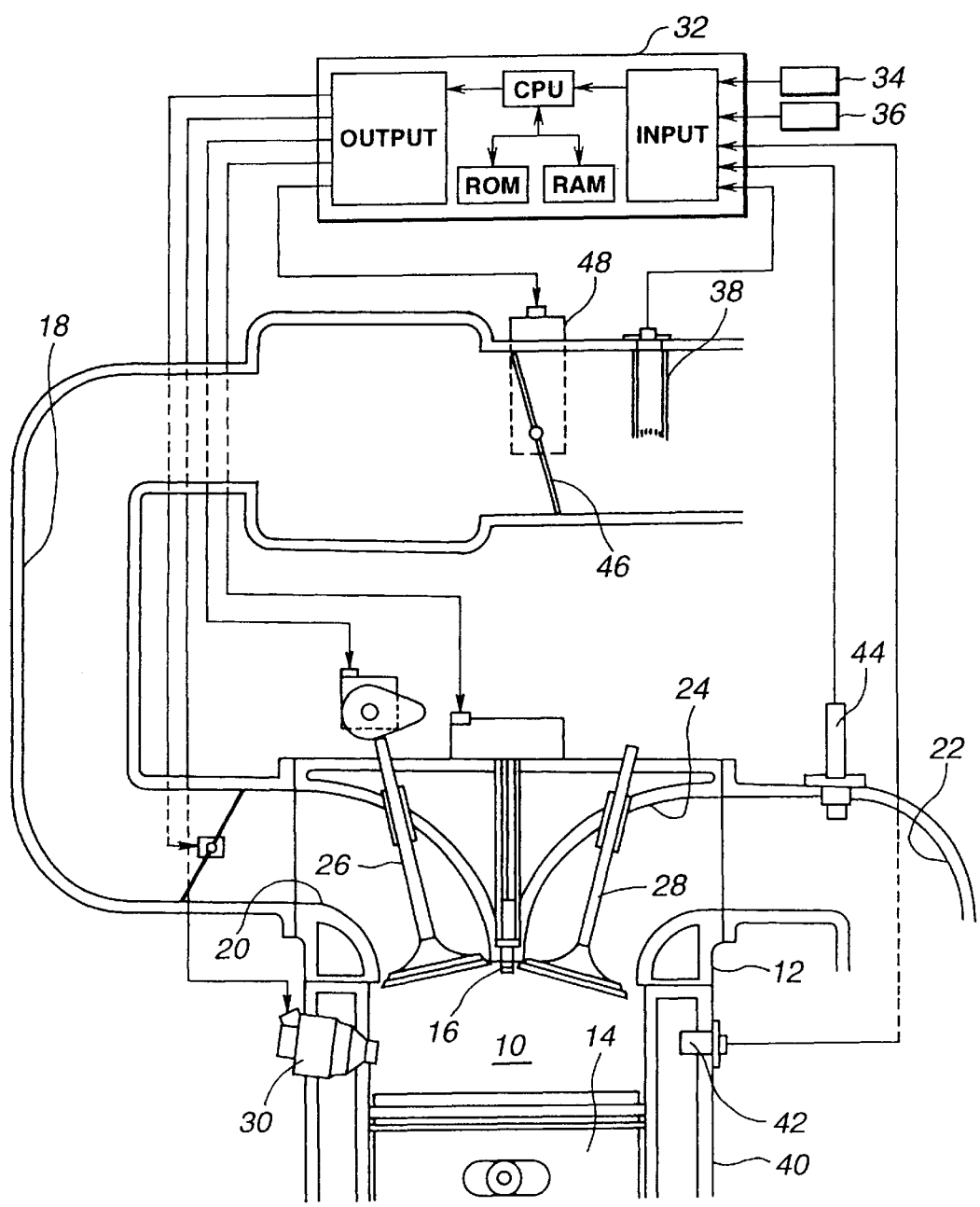
FIG. 1 illustrates schematically an engine system according to the present invention.

FIG. 1 shows a control system for a spark-ignition in-cylinder fuel-injection internal combustion engine.

In FIG. 1, only a portion of the engine is shown. The engine includes cylinders. The reference numeral 10 denotes a combustion chamber in each of the engine cylinders. The combustion chambers 10 are defined between a cylinder head 12 and reciprocating pistons, only one being shown at 14, in the cylinders. The cylinder head 12 has spark plugs, only one being shown at 16, for the combustion chambers, respectively. Each of the spark plugs is so oriented as to provide a spark in the corresponding combustion chamber 10 in the proximity of an axis of the cylinder. An intake pipe or passageway 18 extends to the cylinder head 12. The cylinder head 12 is formed with intake ports, only one being shown at 20, communicating with the intake passageway 18. An exhaust pipe or passageway 22 extends from the cylinder head 12. The cylinder head 12 is formed with exhaust ports, only one being shown at 24, communicating with the exhaust passageway 22. Intake valves, only one being shown at 26, extend into the intake ports 20, respectively. Exhaust valves, only one being shown at 28, extend into the exhaust ports, respectively.

Fuel injectors, only one being shown at 30, are so disposed to direct a jet of fuel directly into the combustion chambers 10, respectively. Fuel is distributed to all of the injectors 30 from a common fuel gallery, not shown.

Each of the fuel injectors is of the solenoid actuated valve type. In response to a fuel injection pulse signal, electric current passes through the solenoid and the valve of injector 30 opens. Supply of electric current passing through the solenoid ends with disappearance of fuel injection pulse, causing the valve to close. Width of fuel injection pulse determines opening duration of valve of the injector. As pressure with which fuel is supplied to the injector is kept constant, the pulse width determines quantity of fuel supplied to the corresponding combustion chamber 10 per each injection period, namely, fuel injection quantity.

An engine controller 32 determines the pulse width of each of fuel injection pulses, which are applied to drivers of solenoids of injectors 30. The controller 32A may include a digital microcomputer containing such generally-known components as a central processing unit (CPU), a read only memory (ROM), a random access memory (RAM) and an input/output interface circuit (I/O).

The controller 32 determines the engine speed by processing sensor outputs of a crankshaft angle sensor 34, and operator power demand from sensor output of an accelerator sensor 36. The accelerator sensor 36 is operatively coupled with an accelerator pedal (or gas pedal) manually operable by the vehicle operator. This sensor 36 generates a voltage signal indicative of depression or opening degree of the accelerator pedal. The controller 36 uses this voltage signal in determining opening or depression degree of the accelerator pedal, namely, accelerator opening degree. In the controller 32, the accelerator pedal opening is regarded as operator power demand. An airflow meter 38 is disposed in the air intake passageway 18 and generates sensor output indicative of quantity of intake air. Mounted to the engine cylinder block 40 is a coolant temperature sensor 42, which detects temperature of the engine coolant and generates sensor output indicative of the engine coolant temperature. An oxygen ($O_2$) sensor 44 is disposed in the exhaust passageway 22 and generates sensor output indicative of oxygen concentration within exhaust gas resulting from combustion in the combustion chambers 10. The sensor outputs of the airflow meter 38, coolant temperature sensor 42, and oxygen sensor 44 are fed to the controller 32.

The sensor outputs of the crankshaft angle sensor 34 include a position signal in the form of a train of pulses that occur at intervals of a unit advance of the crankshaft. They include a reference signal in the form of a train of pulses that occur at a predetermined crankshaft position predetermined degrees before top dead center (BTDC). The controller 32 counts the number of pulses per unit time and uses the counting result as the engine speed.

The controller 32 performs reading operation of the sensor output of the airflow meter 38 at regular time intervals and places the result as a rate of quantity of intake air per a unit time, namely, intake airflow rate.

A throttle valve 46 is disposed in the air intake passageway 18 downstream of a position where the airflow meter 38 is disposed. A throttle actuator 48 is coupled with the throttle valve 46 and includes a throttle position sensor that generates sensor output indicative of opening degree of the throttle valve 46.

The controller 32 inputs information as to accelerator opening degree (APS), engine speed (Ne), intake airflow rate (Q), coolant temperature (Tw), oxygen concentration within the exhaust gas, and throttle opening degree (TVO). The controller 32 performs logical and/or arithmetic operations to find a target throttle opening degree (tTPS) and a width of final fuel injection pulse (TI). Output of the controller 32 that is indicative of tTPS is applied to a throttle control loop wherein the throttle actuator 48 adjusts the throttle valve 46 in a direction to reduce a deviation of actual throttle valve opening (TVO) from tTPS toward zero. Output of the controller 32 that is indicative of TI is applied to a fuel injection control loop wherein a fuel injection pulse is modified to have the pulse width of TI. The controller 32 also controls timing of spark.

Figure 2:
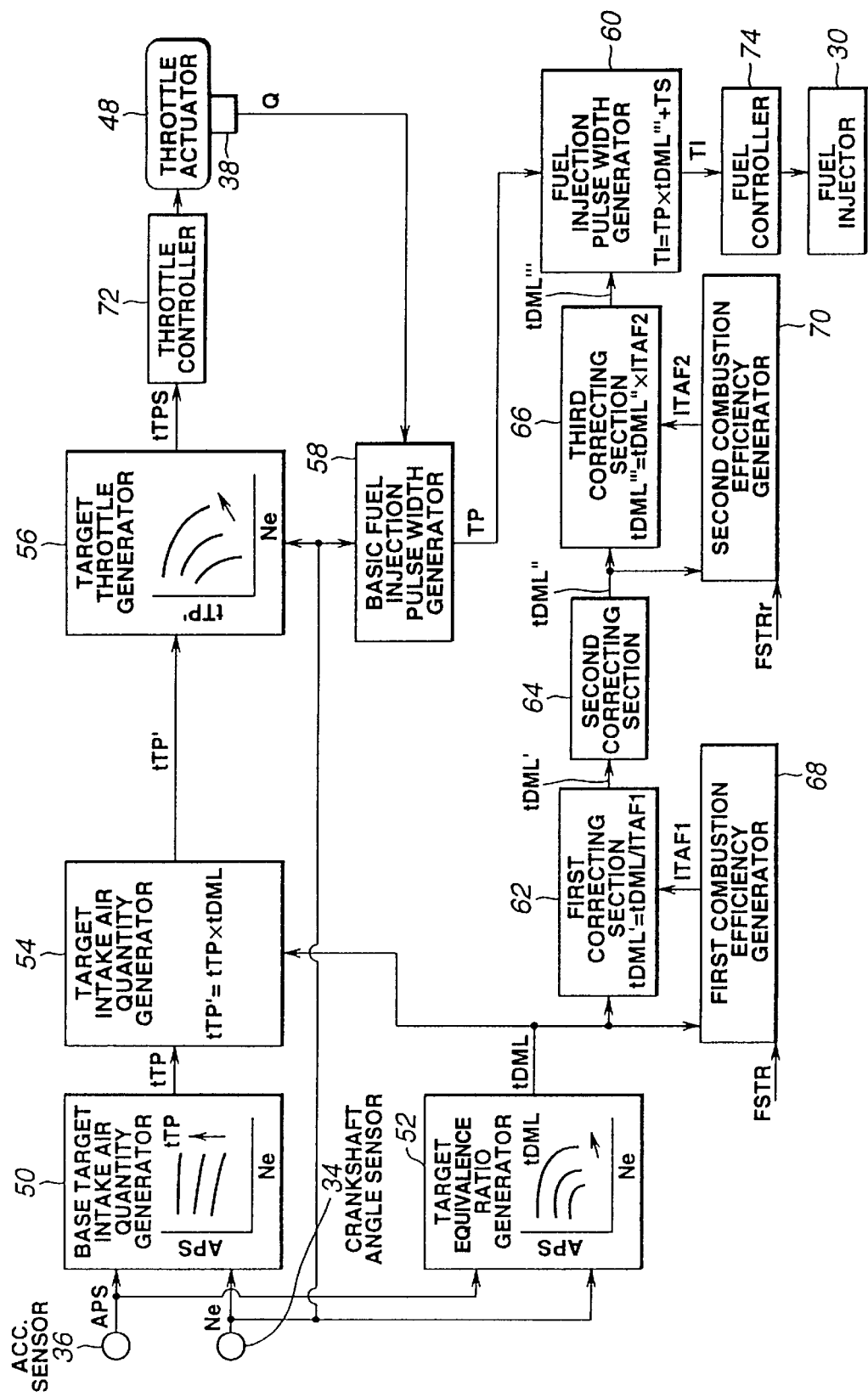
FIG. 2 illustrates a control scheme according to the present invention.

A preferred implementation of the present invention can be understood with reference to the control diagrams in FIG. 2. In FIG. 2, the reference numerals 34, 36, and 38 denote crankshaft angle sensor, accelerator pedal sensor, and airflow meter, respectively.

The driver signal in the form of the accelerator pedal position (opening degree) signal APS is used as one input to a base target intake airflow rate generator 50. The engine speed signal Ne is used as the other input to the generator 50. These inputs APS and Ne determine a current operation state of the engine. Target values of engine torque are predetermined against varying combinations of values of APS and Ne. If air fuel ratio is kept at a base air fuel ratio of stoichiometry, a value of an intake airflow rate may be given, which causes the engine to produce a target value of engine torque for the current operation state of the engine. This value is named a base target intake airflow rate tTP.

In this embodiment, the generator 50 includes a look-up map that contains experimentally determined data of tTP that are retrievable using APS and Ne. Alternatively, the base target intake airflow rate tTP may take the form of a width of a basic fuel injection pulse, which width is indicative of an air quantity admitted to a cylinder during its intake stroke, or it may take the form of the air quantity itself. This map is illustrated in the box 50.

The signals APS and Ne are used as inputs to a target equivalent ratio generator 52. Target values of air fuel ratio are predetermined against varying engine operation states as represented by combinations of values of APS and Ne. In response to a target value of air fuel ratio (or target air fuel ratio) for the current engine operation state, a target equivalence ratio tDML, namely, a first target equivalence ratio, is determined. The target equivalence ratio tDML is given by calculating a ratio (stoichiometry)/(target air fuel ratio). If desired, this ratio may be corrected in dependence upon coolant temperature Tw.

In this embodiment, the generator 52 includes a look-up map that contains experimentally determined data of tDML that are retrievable using APS and Ne. This map is illustrated in the box 52.

The output tTP of the generator 50 and output tDML of the generator 52 are used as inputs to a target intake airflow rate generator 54. In the generator 54, target intake airflow rate tTP' for the target air fuel ratio is determined by computing the following equatrion, $$tTP'=tTP\times tDWL \qquad (1).$$

The target intake airflow rate tTP' is intake airflow rate that causes the engine to produce the target torque with the target air fuel ratio.

The output tTP7 of the generator 54 and the engine speed Ne are used as the inputs to a target throttle generator 56. The target throttle tTPS is a target throttle opening degree of the throttle valve 46, which allows admission of the target intake airflow rate tTP' to the engine cylinders.

In this embodiment, the generator 56 includes a look-up map that contains experimentally determined data of tTPS that are retrievable using tTP' and Ne. This map is illustrated in the box 56.

The output tTPS of the generator 56 is input into a throttle controller 72, which controls via throttle actuator 48 the position or the opening degree of the throttle valve 46.

Airflow rate Q from the airflow meter 38 and engine speed Ne are used as the inputs to a basic fuel injection pulse width generator 58. In the generator 58, the inputs Q and Ne are used to find a basic fuel injection pulse width TP. The basic fuel injection pulse width TP is indicative of fuel injection quantity to be admitted into a cylinder together with intake air quantity during its intake stroke for forming combustible charge with stoichiometry.

The output TP of the generator 58 is input into a fuel injection pulse width generator 60. Also used as the input to this generator 60 is a target equivalence ratio tDWL''', namely, the fourth target equivalence ratio that will be described later. In the generator 60, a product TP×tDWL''' is computed to give effective fuel injection pulse width TE, and a sum TE+TS is computed to give a final fuel injection pulse width TI. TS indicate an invalid pulse width corresponding to the vehicle battery voltage.

The output TI of the generator 60 is input into a fuel controller 74, which opens the valve to allow discharge of fuel through the fuel injector 30 for time duration that is determined by the pulse width TI.

The output tDWL of the target equivalence ratio generator 52 is input into a first correcting section 62 and also into a first combustion efficiency generator 68. The first combustion efficiency 68 outputs a first combustion efficiency ITAF1, which is used as the input to the first correcting section 62. The first correcting section 62 gives a second target equivalence ratio tDML', which is expressed as, $$tDML'=tDML/ITAF1 \qquad (2).$$

The output tDML' of the first correcting section 62 is input into a second correcting section 64. The second correcting section 64 gives a phase delay to the second target equivalence ratio tDML', which corresponds to a delay in admission of intake air into the cylinder, thereby providing a third target equivalence ratio tDML''.

The output tDML'' of the second correcting section 64 is input into a third correcting section 66 and also into a second combustion efficiency generator 70. The second combustion efficiency generator 70 outputs a second combustion efficiency ITAF2, which is used as the input to the third correcting section 66. The third correcting section 66 gives a third target equivalence ratio tDML''', which is expressed as, $$tDML'''=tDML''\times ITAF2 \qquad (3).$$

With regard to the second correcting section 64, the delay processing conducted in this section is to adjust the timing of change in target equivalence ratio tDWL to the timing of change in intake air admitted to the engine cylinder. This is because there always is a delay in change of intake air admitted to the cylinder due to operation delay of throttle valve and the cylinder charging delay.

With regard to the first combustion efficiency ITAF1, a first set of values of combustion efficiency are prepared for stratified charge combustion, and a second set of values of combustion efficiency are prepared for homogeneous charge combustion. A change from the first set for stratified combustion to the second set for homogeneous combustion is made upon occurrence of a change from a request command for stratified combustion to a request command for homogeneous combustion. A change to the first set for stratified combustion from the second set for homogeneous combustion is made upon occurrence of a change to the request command for stratified combustion from the request for homogeneous combustion.

With regard to the second combustion efficiency ITAF2, a third set of values of combustion efficiency are prepared for stratified charge combustion, and a fourth set of values of combustion efficiency are prepared for homogeneous charge combustion. A change from the third set for stratified combustion to the fourth set for homogeneous combustion is made upon occurrence of a rear shift from stratified combustion to homogeneous combustion. A change to the third set for stratified combustion from the fourth set for homogeneous combustion is made upon occurrence of a real shift to stratified combustion from homogeneous combustion.

Figure 3:
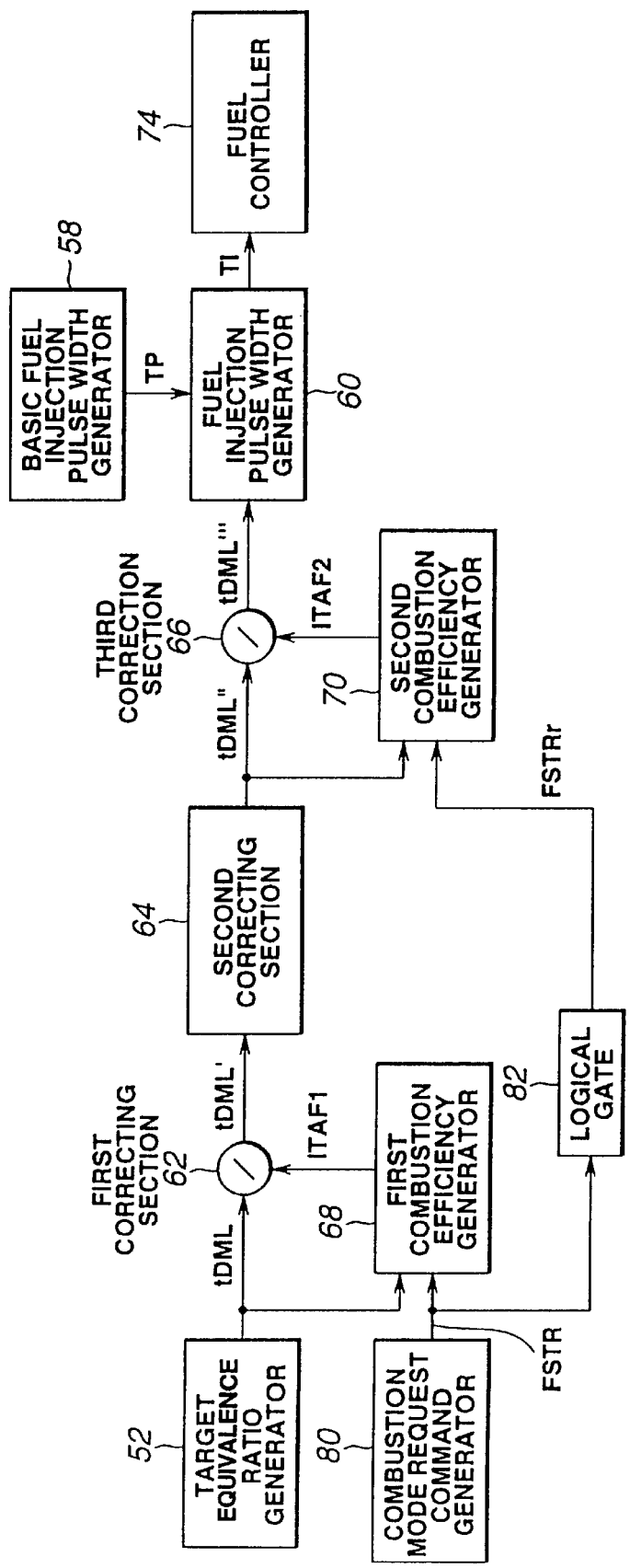
FIG. 3 illustrates a portion of the control scheme.

Referring to FIG. 3, there is shown a fragment of FIG. 2 together with a combustion mode request command generator 80 and a logical gate 82 for determining whether or not a shift from one to the other combustion mode has been made. The request command generator 80 manages a combustion mode request command flag FSTR. This flag FSTR is set (FSTR=1) when one of two combustion modes, namely, stratified combustion and homogeneous combustion, is requested and it is reset (FSTR=0) when the other combustion mode is requested. Thus, in response to the state, which the flag FSTR takes, the first combustion efficiency generator 68 sets the corresponding one of the first and second set of values. Using the target equivalence ratio tDML, the first combustion efficiency generator 68 refers to the corresponding one set that has been set to find an appropriate value of the first combustion efficiency ITAF1.

The logical gate 82 determines whether or not a real shift from one to the other combustion mode has been made. The logical gate 82 manages a combustion mode flag FSTRr. This flag FSTRr is set (FSTR=1) when one of two combustion modes, namely, stratified combustion and homogeneous combustion, is established and it is reset (FSTR=0) when the other combustion mode is established. Thus, in response to the state, which the flag FSTRr takes, the second combustion efficiency generator 70 sets the corresponding one of the third and fourth set of values. Using the third target equivalence ratio tDML'', the second combustion efficiency generator 70 refers the corresponding one set that has been set to find an appropriate value of the second combustion efficiency ITAF2.

Figure 4A:
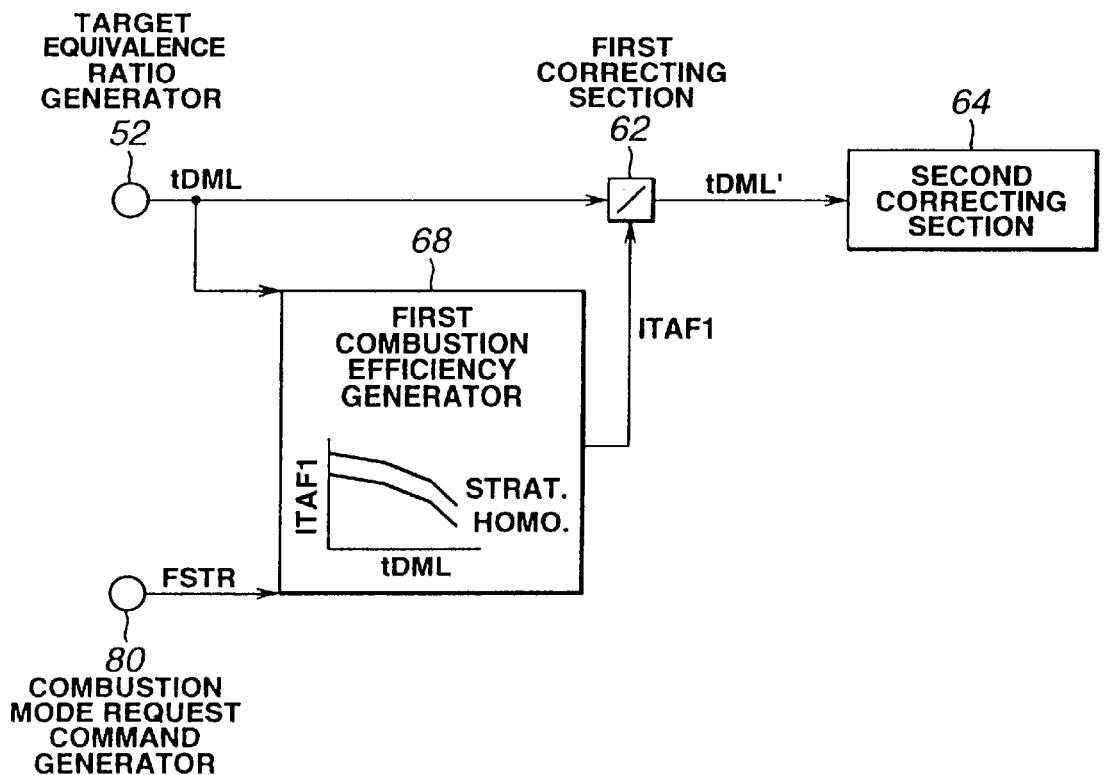
FIGS. 4(A) and 4(B) are portions of FIG. 3.

FIG. 4(A) is a fragment of FIG. 3 and illustrates a preferred example of first combustion efficiency generator 68. According to this example, the values constituting the first set for stratified combustion are mapped in a look-up map in correlation with various values of tDML, and the values constituting the second set for homogeneous combustion are mapped in another look-up map in correlation with various values of tDML. In the block 68 in FIG. 4(A), the correlation of ITAF1 with tDML is illustrated by a curve labeled "STRAT." for the first set of values, and by another curve labeled "HOMO." for the second set of values. In determining an appropriate value of ITAF1, one of the look-up maps is selected in response to the state of the flag FSTR and a table look-up operation of the selected map is performed based on tDML.

Figure 4B:
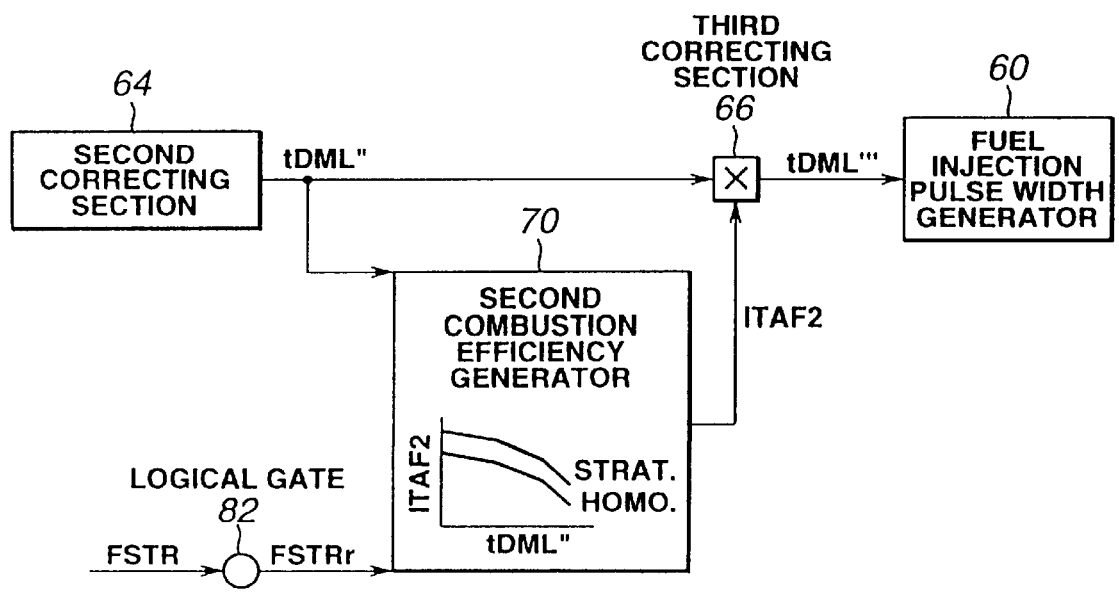

FIG. 4(B) is a fragment of FIG. 3 and illustrates a preferred example of second combustion efficiency generator 70. According to this example, the values constituting the third set for stratified combustion are mapped in a look-up map in correlation with various values of tDML", and the values constituting the fourth set for homogeneous combustion are mapped in another look-up map in correlation with various values of tDML". In the block 68 in FIG. 4(B), the correlation of ITAF2 with tDML" is illustrated by a curve labeled "STRAT." for the third set of values, and by another curve labeled "HOMO." for the fourth set of values. In determining an appropriate value of ITAF2, one of the look-up maps is selected in response to the state of the flag FSTRr and a table look-up operation of the selected map is performed based on tDML".

In the above-mentioned examples of first and second combustion efficiency, exhaust gas recirculation rate (EGR rate) was not taken into account.

Figure 5A:
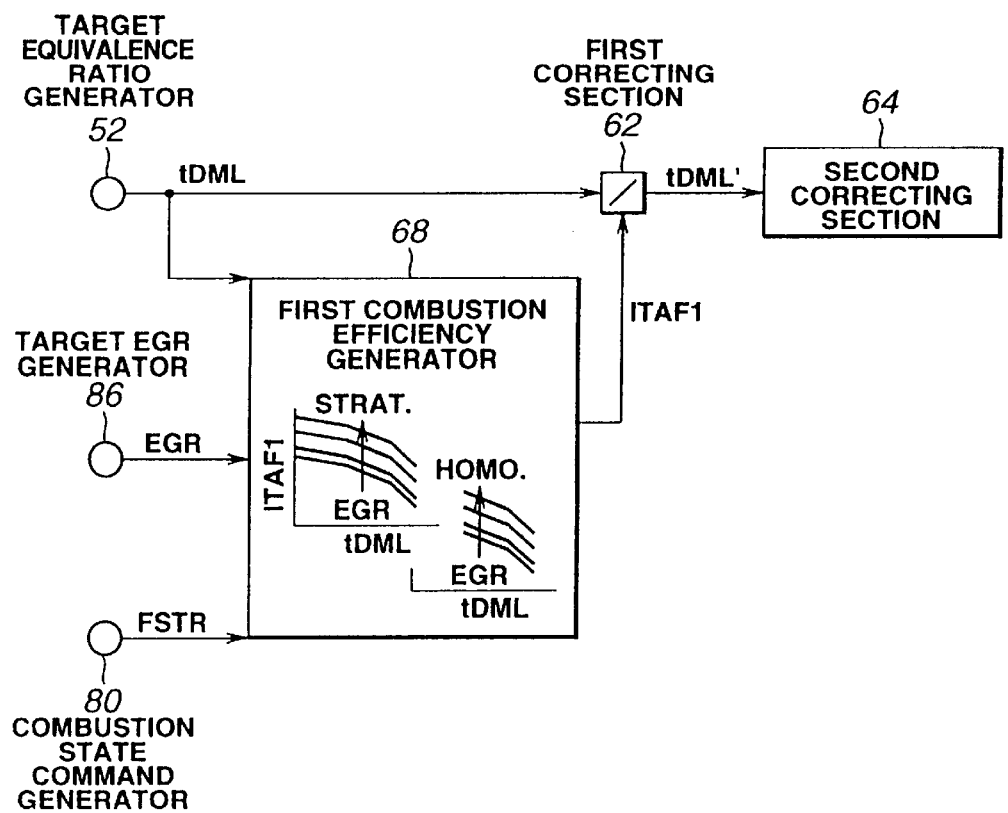
FIGS. 5(A) and 5(B) are similar views to FIGS. 4(A) and 4(B), illustrating modifications.

FIG. 5(A) illustrates another example of first combustion efficiency generator 68 in which EGR rate is taken into account. A target value of EGR rate or target EGR rate from a target EGR generator 86 is used as the input to the first combustion efficiency generator 68. According to this example, the values constituting the first set for stratified combustion are mapped in a look-up map in correlation with various values of tDML and various values of EGR rate. The values constituting the second set for homogeneous combustion are mapped in another look-up map in correlation with various values of tDML and various values of EGR rate. In the block 68 in FIG. 5(A), the correlation of ITAF1 with tDML and EGR rate is illustrated by a group of curves labeled "STRAT." for the first set of values, and by another group of curves labeled "HOMO." for the second set of values. In determining an appropriate value of ITAF1, one of the look-up maps is selected in response to the state of the flag FSTR and a table look-up operation of the selected map is performed based on tDML and target EGR rate.

Figure 5B:
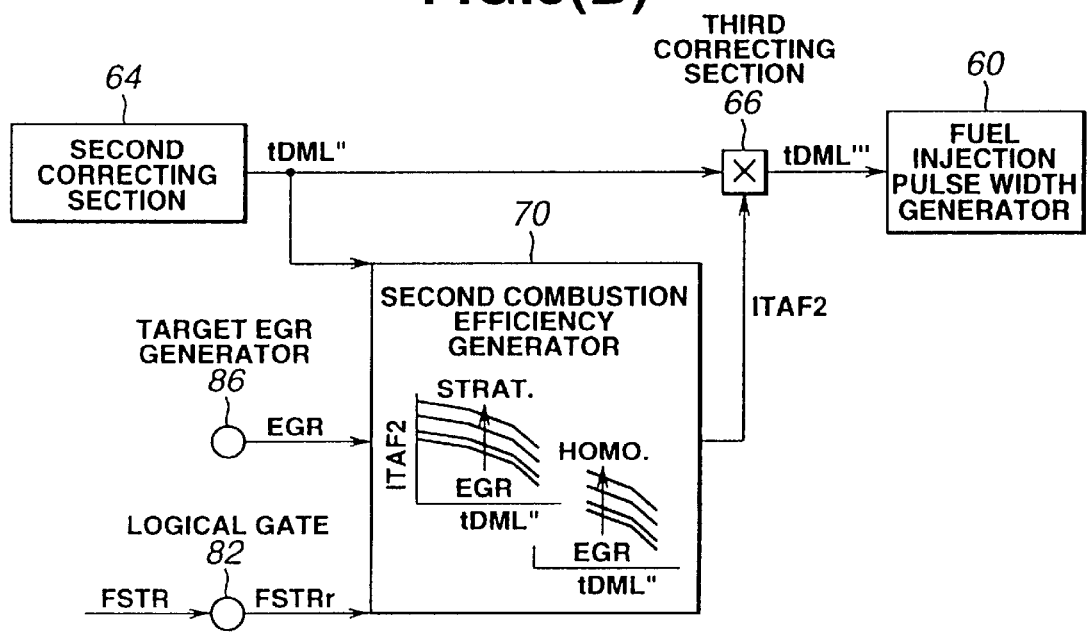

FIG. 5(B) illustrates another example of second combustion efficiency generator 70 in which EGR rate is taken into account. A target value of EGR rate or target EGR rate from a target EGR generator 86 is used as the input to the second combustion efficiency generator 70. According to this example, the values constituting the third set for stratified combustion are mapped in a look-up map in correlation with various values of tDML" and various values of EGR rate. The values constituting the third set for homogeneous combustion are mapped in another look-up map in correlation with various values of tDML" and various values of EGR rate. In the block 70 in FIG. 5(B), the correlation of ITAF1 with tDML" and EGR rate is illustrated by a group of curves labeled "STRAT." for the first set of values, and by another group of curves labeled "HOMO." for the second set of values. In determining an appropriate value of ITAF1, one of the look-up maps is selected in response to the state of the flag FSTRr and a table look-up operation of the selected map is performed based on tDML" and target EGR rate.

The examples of first and second combustion efficiency generators 68 and 70 have proved to be effective in rapidly and smoothly adjusting the engine torque to the target value because not only equivalence ratio, but also EGR are used as parameters.

Figure 6:
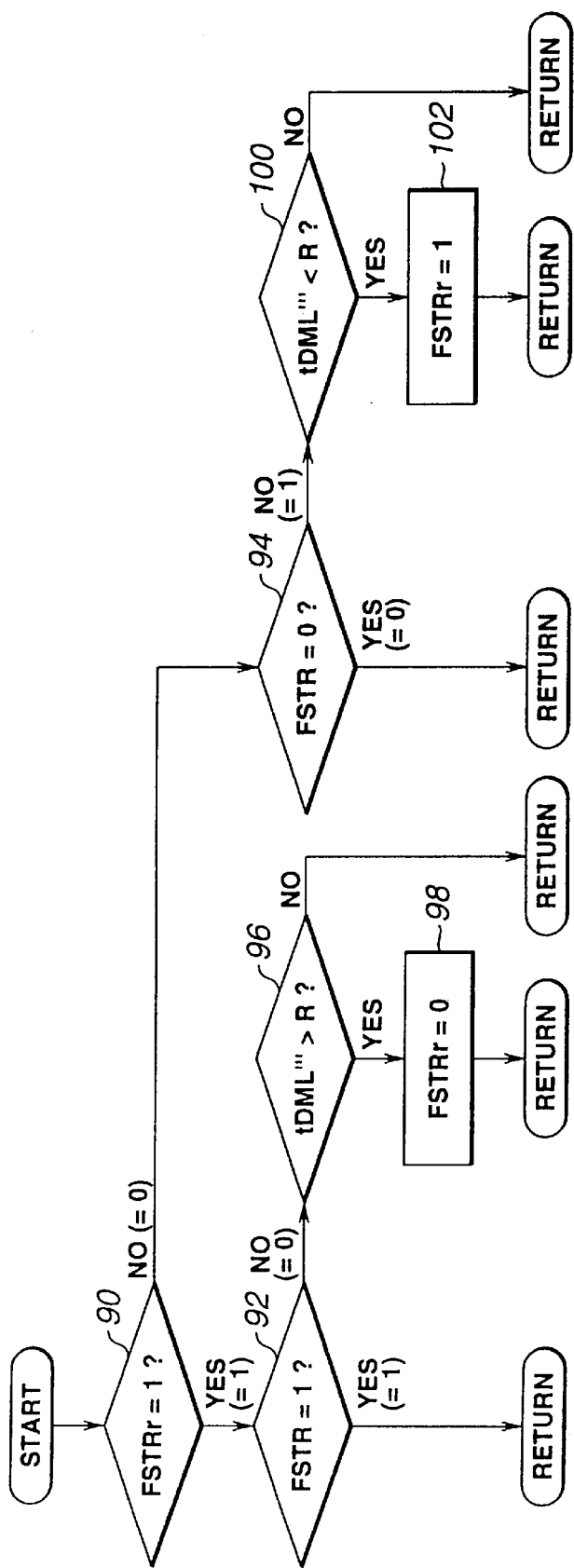
FIG. 6 illustrates a flow chart of a control routine of logic in logical gate 82.

The flow chart of FIG. 6 illustrates a control routine of the preferred implementation of the present invention performed at the logical gate 82.

In an interrogation step 90, the controller 32 (see FIG. 1) determines whether or not the flag FSTRr is set (=1). This is the step where the controller 32 confirms the state of the flag FSTRr that was brought about in the preceding operation cycle. The fact that FSTRr=1 means that stratified combustion was being carried on in the preceding operation cycle. The fact that FSTRr=0 means that homogeneous combustion was being carried on in the preceding operation cycle. If the interrogation in step 90 results in affirmative, the routine proceeds to step 92. If its results in negative, the routine proceeds to step 94.

In step 92, the controller 32 determines whether or not the combustion mode request command flag FSTR is set (=1). If, in step 92, the controller 32 determines that FSTR is set and stratified combustion is requested, the routine returns to step 90 because any change in combustion mode is not needed.

If, in step 92, the controller 32 determines that FSTR is not set (=0) and homogeneous combustion is requested, the routine proceeds to step 96.

In step 96, the controller 32 determines whether or not the fourth equivalent ratio tDML''' is greater than a predetermined value R. If tDML''' is greater than R, homogeneous combustion is being carried on, so that the routine proceeds to step 98. In step 98, the controller 32 resets FSTRr (=0). The fact that FSTRr=0 represents homogeneous combustion.

If, in step 96, tDML''' is not greater than R, the routine returns to step 90. In this case, FSTRr=1 is left unaltered. The fact that FSTRr=1 represents stratified combustion. No change in combustion mode is requested.

If, in step 90, the interrogation results in negative (FSTRr=0), the routine proceeds to step 94. In step 94, the controller 32 determines whether or not FSTR is reset (=0). If this is the case (FSTR=0, homogeneous combustion request command available), the routine returns to step 90, and thus FSTRr=0 is left unaltered. No change in combustion mode is requested.

If, in step 94, FSTR is equal to 1, the routine proceeds to step 100. In step 100, the controller 32 determines whether or not tDML''' is less than the predetermined value R. If this is the case, the controller 32 sets FSTRr (=1) in step 102.

If, in step 100, tDML''' is not less than R, the routine returns to step 90 with FSTRr (=0) left unaltered. No change in combustion mode is requested.

The predetermined value R used in step 114 or 124 may provide hysteresis.

With regard to the first and second combustion efficiency generators 68 and 70, the generators 68 and 70 may perform control routines as illustrated in the flow charts of FIGS. 7(A) and 7(B), respectively.

Referring to FIG. 7(A), in step 110, the controller 32 determines whether or not FSTR is set (=1). If this is the case, the routine proceeds to step 112. In step 112, the controller 32 determines an appropriate value, namely ITAF1(S), out of values constituting the first set for stratified combustion and set ITAF1(S) as ITAF1. Then, the routine returns to step 110. If, in step 110, FSTR is not set (=0), the routine proceeds to step 114. In step 114, the controller 32 determines an appropriate value, namely, ITAF1(H), out of values constituting the second step for homogeneous combustion. Then, the routine returns to step 110.

Referring to FIG. 7(B), in step 120, the controller 32 determines whether or not FSTRr is set (=1). If this is the case, the routine proceeds to step 122. In step 122, the controller 32 determines an appropriate value, namely ITAF2(S), out of values constituting the third set for stratified combustion and set ITAF2(S) as ITAF2. Then, the routine returns to step 120. If, in step 120, FSTRr is not set (=0), the routine proceeds to step 124. In step 124, the controller 32 determines an appropriate value, namely, ITAF2(H), out of values constituting the fourth step for homogeneous combustion. Then, the routine returns to step 120.

Figure 8A:
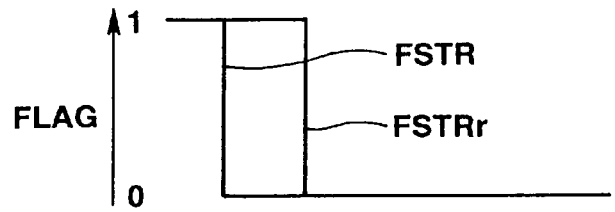
FIGS. 8(A) to 8(E) graph control commands and engine response according to the present invention.
Figure 8B:
Figure 8C:
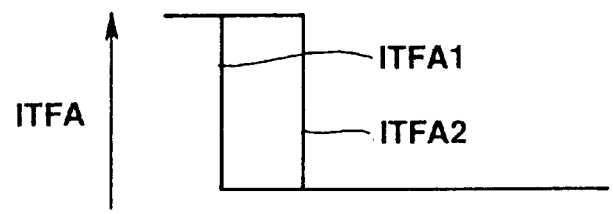
Figure 8D:
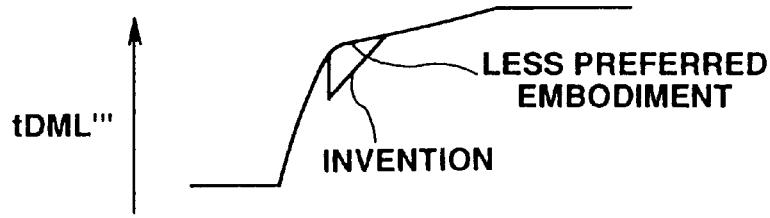
Figure 8E:
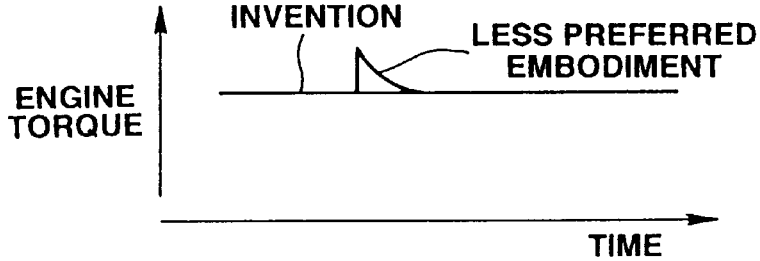

Referring to FIGS. 8(A) to 8(E), let us now consider a transient period from stratified combustion to homogeneous combustion. The transient period is initiated by a change of the flag FSTR from one level (1-level) to zero level (0-level). Upon or immediately after this change, the target equivalence ratio tDML is subjected to a step-like increase, as shown in FIG. 8(B). At the same time, the first combustion efficiency ITFA1 is subjected to a step-like decrease, as shown in FIG. 8(C), from ITFA1(S) to ITFA1(H). As tDML' results from dividing tDML by ITFA1, tDML' is subjected to a step-like increase, while tDML" is subjected to a gradual increase after experiencing a delay as shown in FIG. 8(B). The fourth equivalence ratio tDML'" is subjected to the similar gradual increase until change of the combustion establishment indicative flag FSTRr from one level (1-level) to zero level (0-level). This change of the flag FSTRr occurs upon elapse of time after the flag FSTR changed from the one level to the zero level. This change of the flag FSTRr causes the second combustion efficiency ITFA2 to change from ITFA2(S) to ITFA2(H). As tDML'" is given by multiplying tDML" with ITFA2, tDML'" is subjected to a step-like decrease. This decrease is gradually compensated for. Upon real change of combustion mode from stratified to homogeneous combustion, the air fuel ratio shifts toward lean side by difference of combustion efficiency. The fuel injection pulse width TI decreases reflecting this step-like decrease of tDML'" so that the engine torque remains flat without any disturbance during the shift from stratified combustion to homogeneous combustion as shown in FIG. 8(E). In FIG. 8(D), tDML'" that would result if ITFA2 should fail to change from ITFA2(S) to ITFA2(H) is illustrated, and the engine torque caused by this tDML'" is illustrated in FIG. 8(E).

According to the embodiment illustrated in FIGS. 5(A) and 5(B), the first and second combustion efficiencies ITFA1 and ITFA2 are retrieved using the EGR rate as one of parameters. Thus, the actual engine torque can be adjusted to the target engine torque with better precision.

Figure 9:
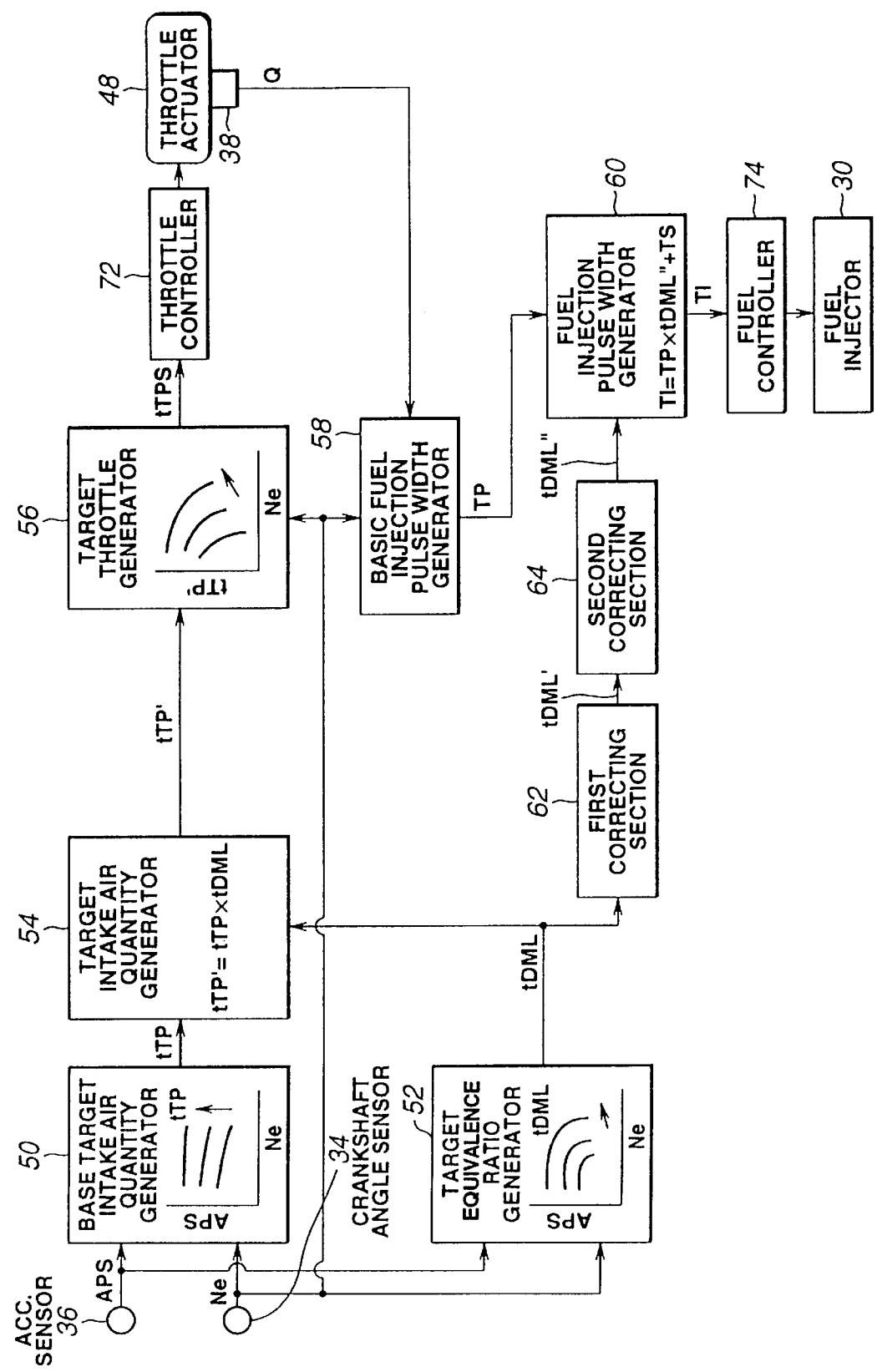
FIG. 9 illustrates another control scheme according to the present invention.

FIG. 9 illustrates still another embodiment according to the present invention. This embodiment is substantially the same as the embodiment illustrated in FIG. 2. The former is different from the latter in that first and second correcting sections 62 and 64 have replaced the first, second, and third correcting sections 62, 64, and 66. Specifically, a third equivalence ratio tDML", which is an output of the second correcting section 64 is input into a fuel injection pulse generator 60 in FIG. 9. According to the embodiment in FIG. 2, the fourth equivalence ratio tDML'", which is an output of the third correcting section 66, was input into the fuel injection pulse generator 60. In both of the embodiments, the second correcting section 64 that exhibits the identical function is used. The first correcting section 62 used in this embodiment is slightly different from its counterpart used in the embodiment shown in FIG. 2.

Figure 10:
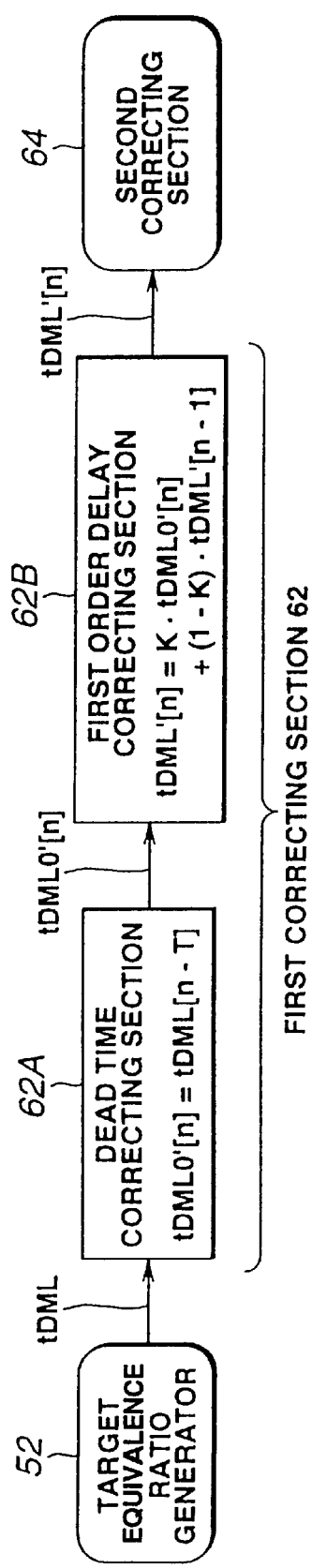
FIG. 10 illustrates a portion of the control scheme of FIG. 9.

Referring to FIG. 10, at the first correcting section 62, a target equivalence ratio is corrected based on a correction efficiency that represents a difference in phase between a target throttle opening degree and an actual throttle opening degree. For example, this correction efficiency is determined based on response characteristic of a throttle actuator 48 (see FIG. 1).

In this case, the target equivalence ratio is corrected by dead time correcting means and/or first order correcting means using such as weighted means.

Correction efficiency used in the above-mentioned dead time correcting means or first order correcting means is set against such parameters as battery voltage and operation state of a throttle valve 46 as represented by current throttle opening degree and direction in which the throttle valve moves 46.

FIG. 10 illustrates one preferred example of a first correcting section 62. The first correcting section 62 includes a dead time correcting section 62A and a first order delay correcting section 62B.

At the dead time correcting section 62A, the target equivalent ratio tDML is corrected based on dead time T (correction efficiency) to give as a result tDML0' using the following equation, $$tDML0'[n]=tDML[n-T] \tag{4}$$

The target equivalence ratio as corrected tDML0'[n] is used as the input to the first order delay correcting portion 62B.

At the first order delay correcting portion 62B, the input tDML0'[n] is corrected based on weighted mean coefficient K (correction coefficient) to give as a result tDML'[n], namely, second target equivalence ratio, using the following equation, $$tDML'[n]=K \cdot tDML0'[n]+(K-1) \cdot tDML'[n-1] \tag{5}$$

The second target equivalence ratio tDML'[n] is used as the input to the second correcting portion 64.

Figure 11:
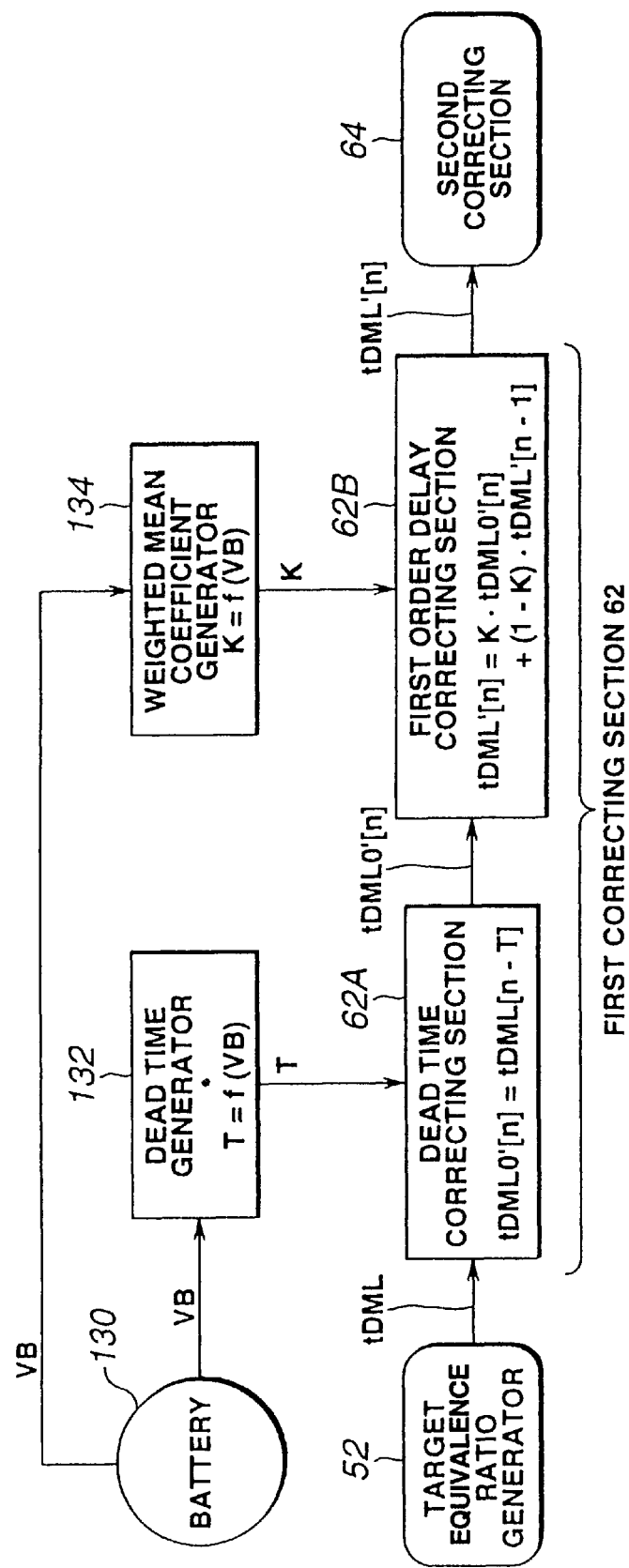
FIG. 11 is a similar view to FIG. 10 illustrating a modification.

FIG. 11 illustrates another preferred example of a first correcting portion 62. This first correcting portion 62 is substantially the same as its counterpart shown in FIG. 10 except the fact that dead time T and weighted mean coefficient K are determined using battery voltage as a parameter.

Battery voltage signal VB from a battery 130 is used as the inputs to a dead time generator 132 and a weighted mean coefficient generator 134.

At the dead time generator 132, the dead time T is determined as a function of the battery voltage VB, which relation may be expressed as, $$T=f(VB) \tag{6}$$

At the weighted mean coefficient generator 134, the weighted mean coefficient K is determined as a function of the battery voltage VB, which relation may be expressed as, $$K=f(VB) \tag{7}$$

Figure 12:
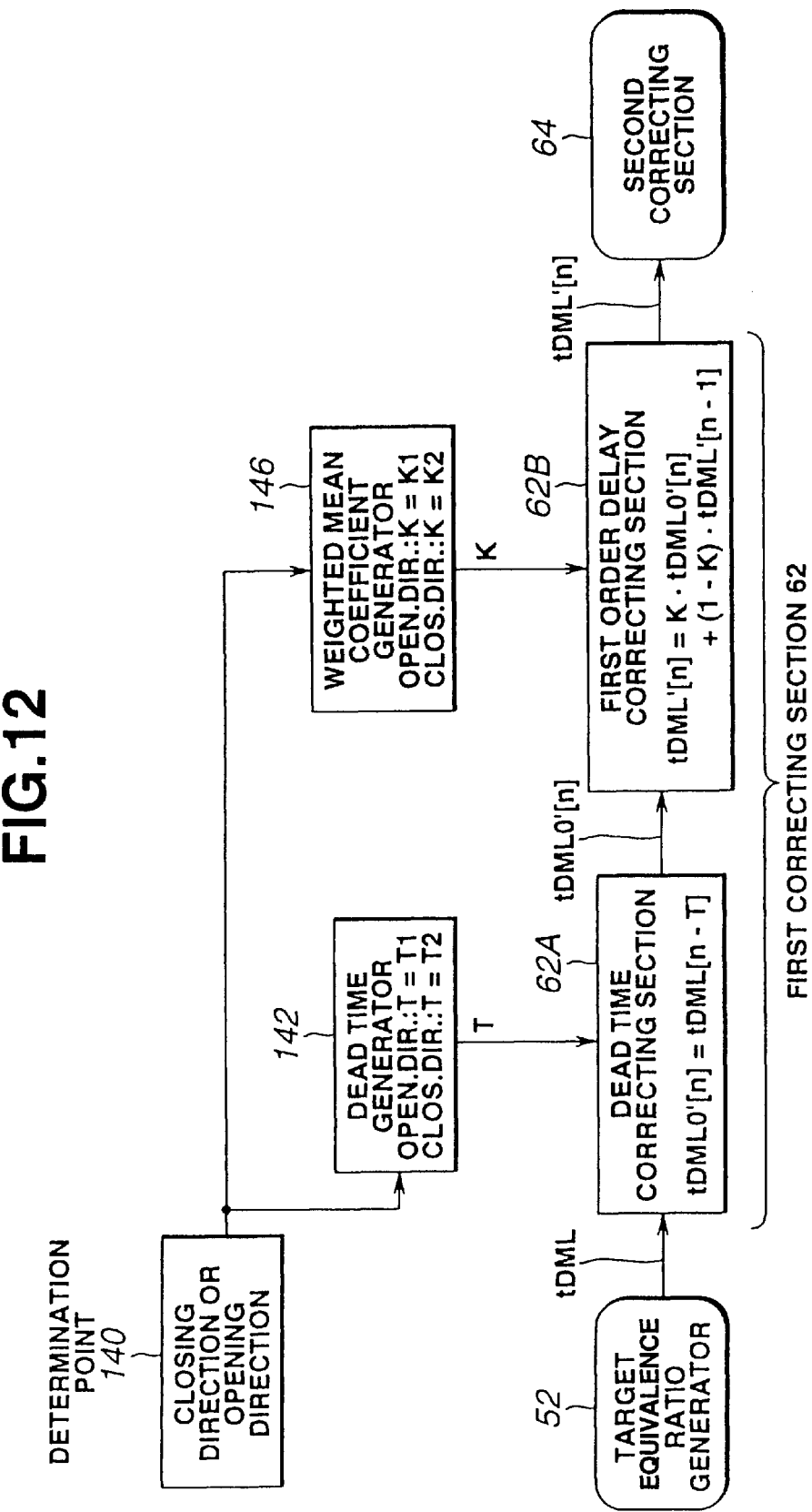
FIG. 12 is a similar view to FIG. 11 illustrating another modification.

FIG. 12 illustrates still another preferred example of a first correcting portion 62. This first correcting portion 62 is substantially the same as its counterpart shown in FIG. 10.

The former is different from the latter in that dead time T and weighted mean coefficient K are determined using the state (for example, the direction in which the throttle valve 46 moves) of throttle valve 46 as a parameter.

At a determination point or block 140, it is determined whether the throttle valve 46 moves in closing direction or in opening direction. A flag indicative of the result of determination at the point 140 is used as the inputs to a dead time generator 142 and a weighted mean coefficient generator 146.

At the dead time generator 142, the dead time T is determined depending upon which direction the throttle valve 46 moves in. The relation may be expressed as, T=T1 if in opening direction
T=T2 if in closing direction.

At the weighted mean coefficient generator 146, the weighted mean coefficient K is determined depending upon which direction the throttle valve 46 moves in. The relation may be expressed as, K=K1 if in opening direction
K=K2 if in closing direction.

Figure 13:
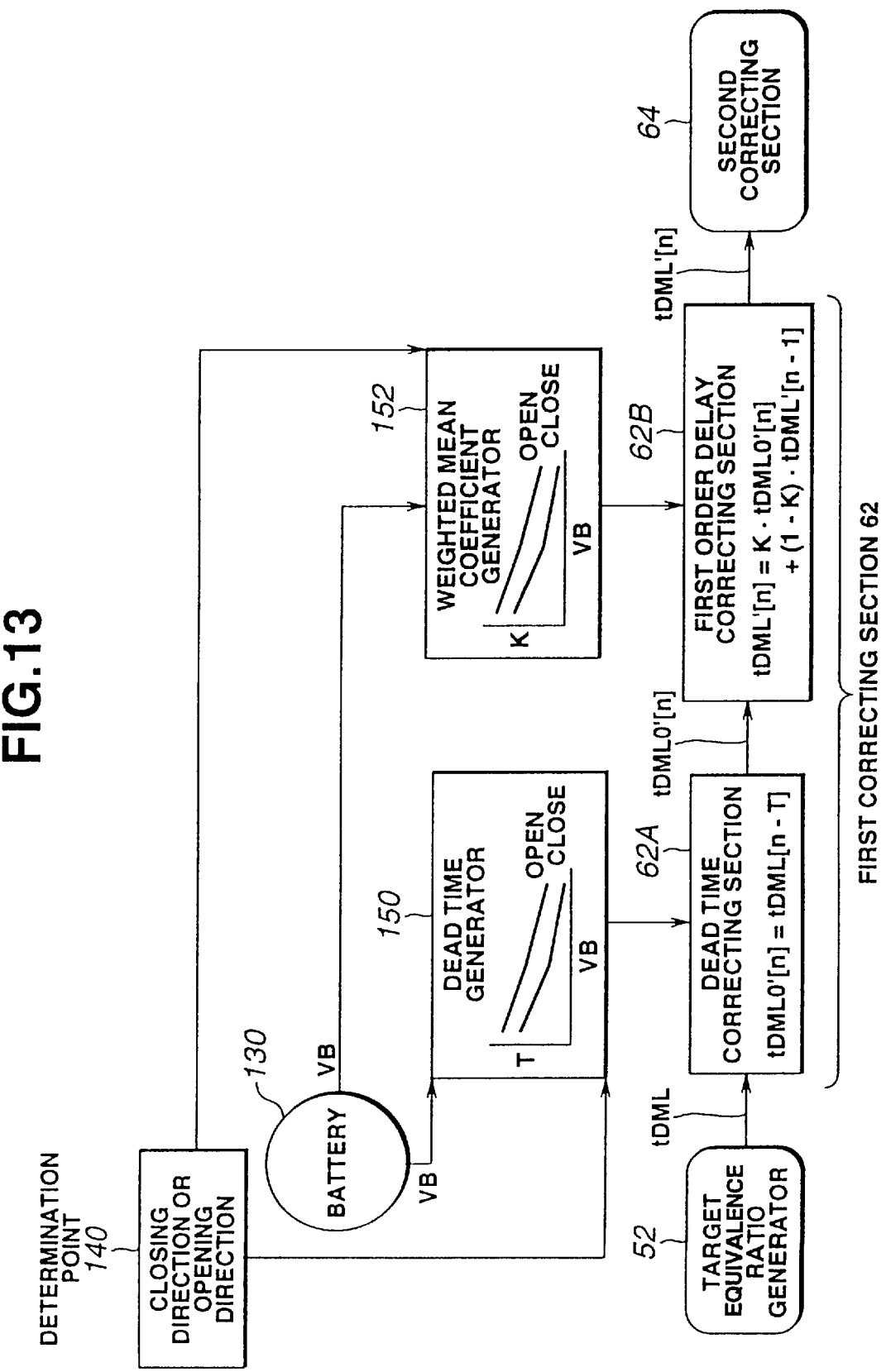
FIG. 13 is a similar view to FIG. 11 illustrating still another modification.

FIG. 13 illustrates most preferred example of a first correcting portion 62. This first correcting portion 62 is substantially the same as its counterpart shown in FIG. 10. The former is different from the latter in that dead time T and weighted mean coefficient K are determined using battery voltage signal VB of battery 130 and the state (for example, the direction in which the throttle valve 46 moves) of throttle valve 46 as parameters.

The battery voltage signal VB is used as the inputs to a dead time generator 150 and a weighted mean coefficient generator 152. At a determination point or block 140, it is determined whether the throttle valve 46 moves in closing direction or in opening direction. A flag indicative of the result of determination at the point 140 is used as the inputs to the dead time generator 150 and weighted mean coefficient generator 152.

The dead time generator 150 contains a look-up map in which various values of dead time T are mapped in correlation with various values of battery voltage VB and direction in which the throttle valve 46 moves. In the generator 150, a table look-up operation of the map is performed to give dead time T.

The weighted mean coefficient generator 152 contains a look-up map in which various values of weighted mean coefficient K are mapped in correlation with various values of battery voltage VB and direction in which the throttle valve 46 moves. In the generator 152, a table look-up operation of the map is performed to give weighted mean coefficient K.

Figure 14:
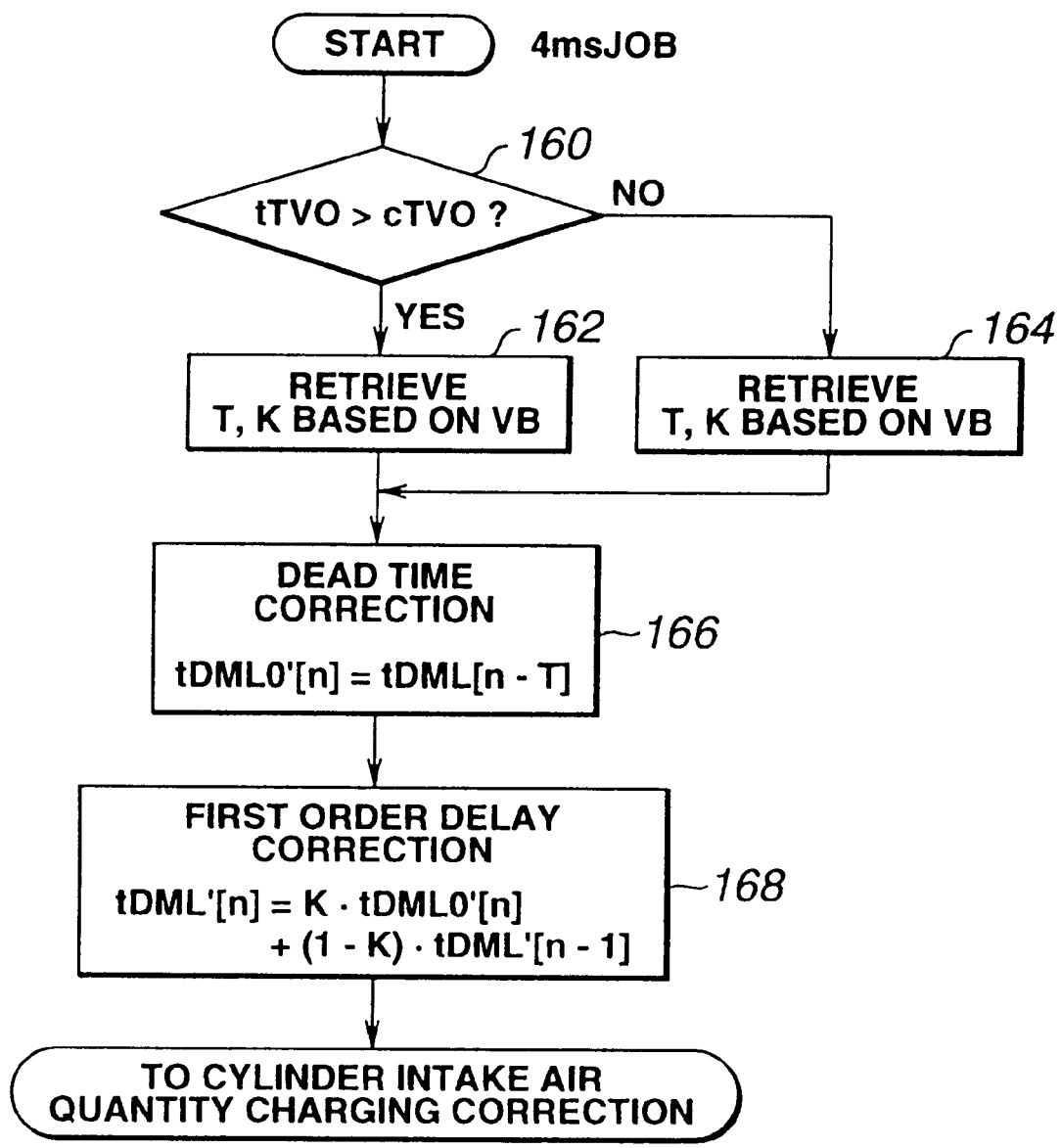
FIG. 14 is a flow chart of a control routine implementing the control scheme illustrated in FIG. 9.

The flow chart of FIG. 14 illustrates a control routine showing the preferred implementation of the invention described in connection with FIG. 13. The routine is repeated at regular intervals of 4 milliseconds.

In step 160, controller 32 determines whether or not a target value throttle opening degree tTVO is greater than an actual or current value of throttle opening degree cTVO. If this is the case, the controller 32 determines that the throttle valve 46 is moving in its opening direction and the routine proceeds to step 162. In step 162, the controller 32 retrieves the maps for opening direction based on VB to determine dead time T and weighted mean coefficient K. If, in step 160, tTVO is less than cTVO, the controller 32 determines that the throttle valve 46 is moving in its closing direction and the routine proceeds to step 164. In step 164, the controller 32 retrieves the maps for closing direction based on VB to determine dead time T and weighted mean coefficient K. After step 162 or 164, the routine proceeds to step 166.

In step 166, the controller 32 corrects target equivalent ratio tDML based on the determined dead time T to give as a result tDML0'[n] using the equation (4). In the next step 168, the controller 32 corrects the determined tDML0'[n] based on the determined weighted mean coefficient K to give as a result tDML'[n], namely, second target equivalent ratio, using the equation (5).

The second target equivalence ratio tDML' is used as the input to the second correcting portion 64 (see FIG. 13). In the second correcting portion 64, the controller 32 determines a third target equivalence ratio tDML" having a delay in phase with respect to the second target equivalence ratio tDML'.

From the preceding description, it is now appreciated that the intake air and fuel quantities (fuel injection width) are adjusted to their target values, respectively. As a result, satisfactorily good exhaust gas purification is accomplished by maintaining a target air fuel ratio, and at the same time good derivability is provided by obtaining necessary target engine torque.

In the embodiments illustrated in FIGS. 9 to 14, the third target equivalence ratio tDML" is used to control fuel supply. Thus, a target value of engine torque is accomplished with good precision because disturbance in actual value in engine torque, which would otherwise occur during change in air fuel ratio to follow a change in target value in air fuel ratio, is avoided.

Figure 17:
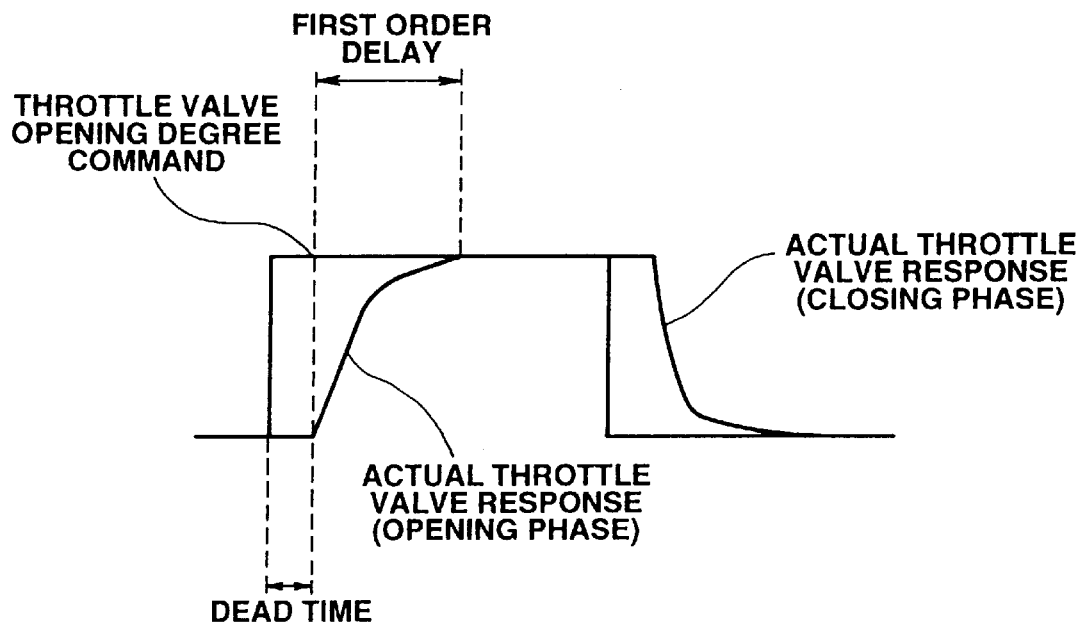
FIG. 17 graphs throttle command and the engine throttle response.

As illustrated in FIG. 17, there is a phase delay between a target value of throttle valve opening degree tTVO and an actual value of throttle valve opening degree cTVO in addition to a delay in intake air quantity. Since both of these delays are taken into account in correcting target equivalence ratio tDML, the third target equivalence ratio tDML" varies in phase relation with varying in-cylinder intake air quantity. As a result, a deviation of an actual value of engine torque from a target value thereof is kept substantially zero even during transient period in which the target value in air fuel ratio changes.

Figure 15A:
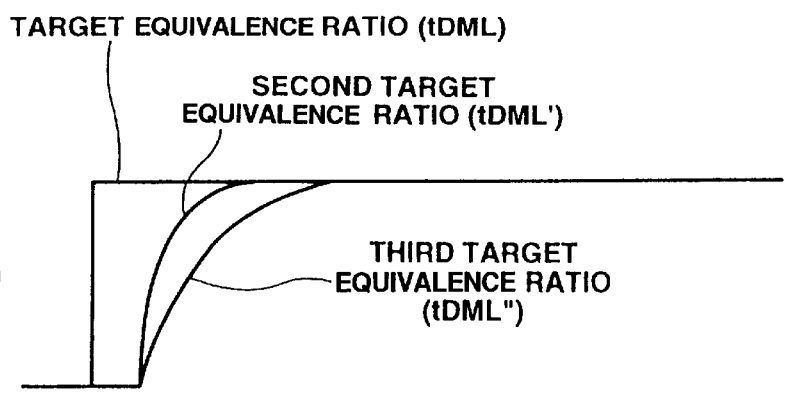
FIG. 15(A) graphs control commands according to the present invention.
Figure 15B:
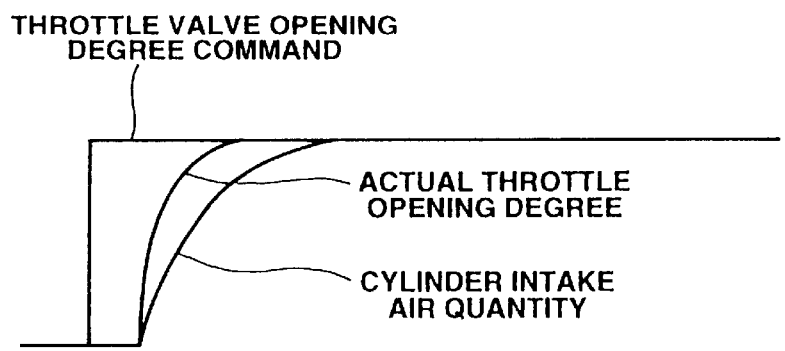
FIG. 15(B) graphs throttle control command and the engine throttle response.

Reference is now made to FIGS. 15(A) and 15(B). Suppose, at a moment, the target equivalence ratio tDML, see FIG. 15(B), and throttle valve opening degree command or target throttle command, see FIG. 15(A), are subjected to step increases, respectively. As shown in FIG. 15(B), after this moment, the actual throttle opening degree cTVO stays unaltered over a dead time T and thus there is no change in cylinder intake air quantity. Upon elapse of this dead time T, the actual throttle opening degree cTVO starts increasing. Subsequently, over a period of time called the first order delay, the actual throttle opening degree cTVO increases to a level as high as the target throttle command. The cylinder air quantity increases at a rate slower than a rate at which the actual throttle opening degree cTVO increases. In FIG. 15(A), the dead time T and the first order delay are taken into account to determine second target equivalence ratio tDML' and then a delay in intake air supply is taken into account to determine third target equivalence ratio tDML". It is now appreciated that the third target equivalence ratio tDML" varies in phase with the cylinder intake air quantity.

Figure 16A:
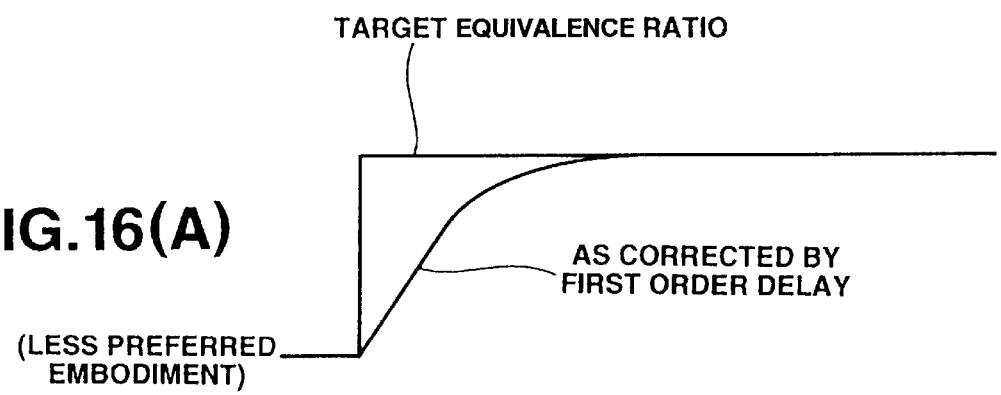
FIG. 16(A) graphs control commands according to less preferred embodiment.
Figure 16B:
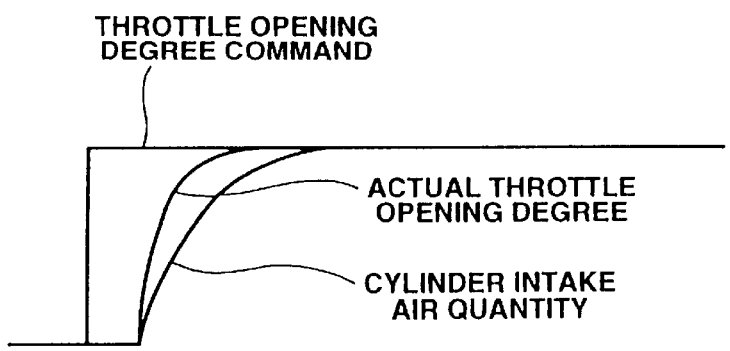
FIG. 16(B) graphs throttle control command and the engine throttle response.

Reference is now made to FIGS. 16(A) and 16(B). FIG. 16(B) is identical with FIG. 15(B). FIG. 16(A) illustrates a less preferred embodiment in which the target equivalence ratio tDML is corrected based on the first order delay in intake air supply to give second target equivalence ratio. In this case, the second target equivalence ratio does vary in phase with varying cylinder intake air quantity shown in FIG. 16(B).

Figure 18:
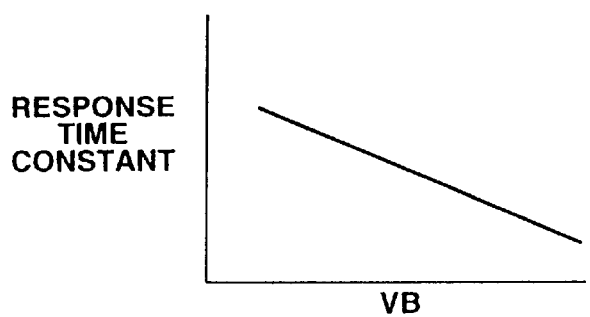
FIG. 18 graphs response versus battery voltage (VB) characteristic.

FIG. 18 illustrates that response time constant varies versus various values of battery voltage VB.

According to the embodiments illustrated in FIGS. 9 to 14, correction of the phase difference between a target value of throttle opening degree and an actual value thereof is independent from correction of the delay in intake air supply. This results in more appropriate phase correction of the target equivalent ratio.

If desired, a target value of intake air quantity that corresponds to a target air fuel ratio may be determined based on a target value of engine torque and engine speed. In this case, the target value of engine torque may be determined based on an accelerator position and engine speed. Alternatively, the target value of engine torque may be given by an external instruction.

Figure 19:
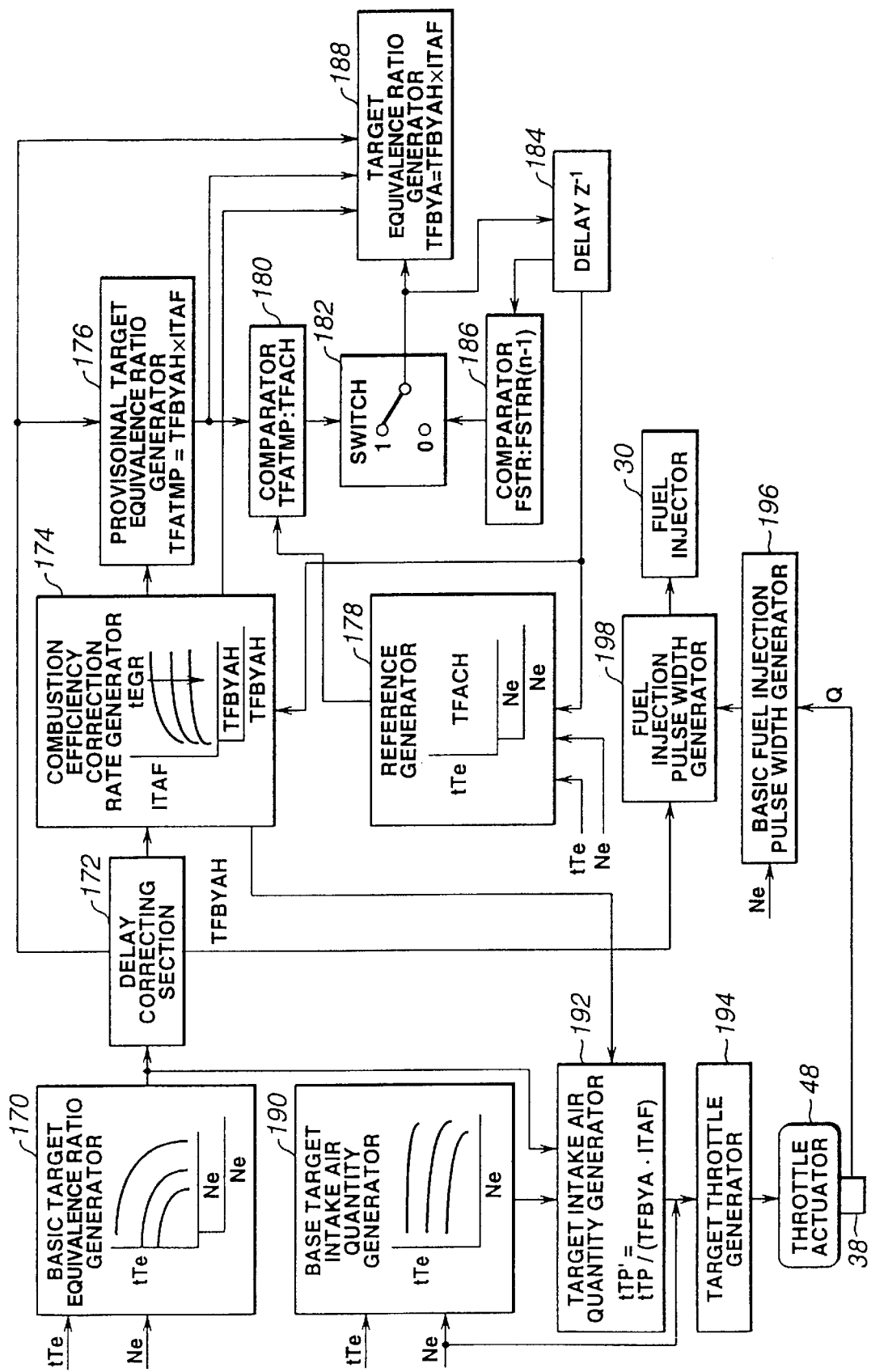
FIG. 19 illustrates still another control scheme according to the present invention.

Another preferred implementation of the present invention can be understood with reference to the control diagrams in FIG. 19. In FIG. 19, the reference numerals 30, 38, and 48 designate a fuel injector, an airflow meter, and a throttle actuator, respectively.

An actual value of engine speed Ne and a target value of engine torque tTe are used as inputs to a basic target equivalent ratio generator 170. Based on basic engine operating state as represented by a combination of these inputs Ne and tTe, a controller 32 performs a table look-up operation of a selected one of a plurality of maps to determine a basic target equivalence ratio TFBYAB. The target engine torque tTe may be defined based on an accelerator pedal state or position APS and engine speed Ne. Specifically, the generator 170 includes a plurality of maps, each containing various values of TFBYAB against various combinations of Ne and tTe. The plurality of maps is prepared for the following reason. With the same engine operating condition, a determination whether or not combustion with lean air fuel ratio should be permitted and a determination whether homogeneous charge combustion or stratified charge combustion should be conducted may alter with variations of other factors. Such factors include engine coolant temperature, elapsed time after engine startup, vehicle speed, vehicle acceleration, and accessory drive load at idling. Combustion efficiency during homogeneous charge combustion is different from combustion efficiency during stratified charge combustion. Thus, a change in combustion mode causes a change in combustion efficiency, bringing about a step-like change in TFBYAB. As the discussion proceeds, it will be noted that the generator 170 also performs the function of determining a change in target equivalence ratio. The output TFBYAB of the generator 170 is used as the input to a delay correcting section 172.

The delay correcting section 172 provides a phase delay with respect to TFBYAB. Suppose now a target value of intake air quantity is altered to cope with a change in TFBYAB. There is delay in operation of a throttle valve 46. There is also a delay in change in actual value of intake air quantity owing to volume of intake pipe 18. However, there is little delay in change in actual value of fuel injection quantity. As a result, a change in an actual value of equivalence ratio occurs with a delay after the change in TFBYAB has occurred. To cope with this situation, TFBYAB is subjected to the phase delay. The delay correcting section 172 performs the phase delay operation to cope with the case where TFBYAB switches its level in a step-like manner in response to determination that a change in combustion mode has taken place. The phase delay operation requires an operation delay of throttle valve that varies with a change, in magnitude, of target value of equivalence ratio, and a correction coefficient that gives at least the first stage of the first order delay corresponding to volume of intake pipe 18. If desired, the first order delay may be corrected using the weighted mean. If simplicity is demanded, correction for the delay that corresponds to the volume of intake pipe 18 suffices. The delay correcting section 172 outputs a delayed target value of equivalence ratio TFBYAH.

The output TFBYAH of the delay correcting section 172 is used as the input to a combustion efficiency correction rate generator 174. The combustion efficiency correction rate generator 174 determines a combustion coefficient correction rate ITAF that varies with varying values of equivalence ratio by retrieval from a selected one of maps. The correction rate ITAF is variable with tEGR rate. Thus, the maps each contain values of ITAF versus values of TFBYAH with tEGR as a parameter. As mentioned before, with the same equivalence ratio, stratified charge combustion and homogeneous charge combustion have different combustion efficiencies, respectively. Thus, different maps are prepared for different combustion modes. With the same combustion state, the combustion efficiency drops as the equivalence ratio increases. Thus, the setting is such that the combustion efficiency correction rate ITAF increases as TFBYAH increases, thereby to cause a target value of equivalence ratio to increase to meet demand for an increase in required fuel quantity. Different maps are prepared for different combustion modes because, with the same equivalence ratio that falls in a combustible equivalence ratio range common to both stratified and homogeneous combustion modes, the combustion efficiency for stratified charge combustion is lower than that for homogeneous charge combustion. Among the maps, an appropriate one is selected in response to result from determining which one of combustion modes has been selected.

The output ITAF of the correction rate generator 174 and the output TFBYAH of the delay correcting section 172 are used as the inputs to a provisional target equivalence ratio generator 176. The generator 176 determines a provisional target equivalence ratio TFATMP, which is expressed as, $$TFATMP = TFBYAH \times ITAF \qquad (8).$$

A one cycle previous value FSTRR(n−1) of a combustion mode flag FSTRr is fed to the combustion efficiency correction rate generator 174 for use in operation to select an appropriate one of the maps.

This previous value FSTRR(n−1) is fed also to a reference generator 178, which is operative to generate a reference value TFACH. The generator 178 includes two maps, namely, a S to H shift map containing various equivalence ratio values of TFACH for a shift from stratified combustion to homogeneous combustion, and a H to S map containing various equivalence ratio values of TFACH. The S to H map is selected when stratified combustion is selected, while the H to S map is selected when homogeneous combustion is selected. In each of the maps, various values of TFACH are arranged versus values of engine speed Ne and values of target engine torque tTe. As mentioned before, stratified combustion and homogeneous combustion have different combustion efficiencies, respectively, and thus different equivalence ratios are requested to yield the same engine speed and torque. This is the reason why two maps are needed. The reference generator 178 performs a table look-up operation of the selected map based on the inputs tTe and Ne.

The output TFACH of the reference generator 178 is used as one input to a comparator 180. The output TFATMP of the provisional target equivalence ratio generator 176 is provided to the other input to the comparator 180. This comparator 180 determines whether or not TFATMP is less than TFACH. If this is the case, the combustion mode flag FSTRR is set equal to 1 at a switch 182 for stratified charge combustion. If TFATMP∞TFACH, the combustion mode flag FSTRR is equal to 1 at a switch 182 for stratified charge combustion.

The content of the flag FSTRR is used as the input to a delay 184. The delay 184 outputs the previous content FSTRR(n−1) of the flag FSTRR. The output of the delay 184 is fed to the combustion efficiency correction rate generator 174, and reference generator 178 for use in operation to select maps.

The output FSTRR(n−1) of the delay 184 is used as one input to a second comparator 186. A combustion mode request command flag FSTR is used as the other input to the second comparator 186. In this embodiment, the flag FSTR is set (=1) when stratified charge combustion is requested, while the flag FSTR is reset (=0) when homogeneous charge combustion is requested. Engine operating conditions including rate of TFBYAB that is determined at the generator 170 are taken into account in controlling the flag FSTR. The comparator 186 compares the flag FSTR with the previous value FSTRR(n−1) of the flag FSTRR to find whether or not the requested change in combustion mode has been completed. As mentioned before, the fact that FSTRR is equal to 1 represents stratified charge combustion, while the fact that FSTRR is equal to 0 represents homogeneous charge combustion. If the result of comparison at the comparator 186 shows that FSTR is equal to FSTRR (n−1), the content of the flag FSTRR at the switch 182 is set equal to the previous value FSTRR(n−1).

The output TFBYAH of the delay correcting section 172 and the output ITAF are used as inputs to a target equivalence ratio generator 188. In response to the content of the combustion mode flag FSTRR, the target equivalence ratio generator 188 determines the final target equivalence ratio TFBYA. Suppose that combustion mode during the previous cycle is equal to combustion mode that has been determined during current cycle after comparing TFATMP, which has been obtained by computation using ITAF for the previous combustion mode, with the reference TFACH. In this case, the generator 188 sets TFATMP as the final target equivalence ratio TFBYA. If this is not the case, the generator 188 computes combustion efficiency correction rate ITAF for the current combustion mode and uses this newly obtained ITAF in calculating the following equation to newly determine target equivalence ratio TFBYA for the current combustion mode.

Figure 21:
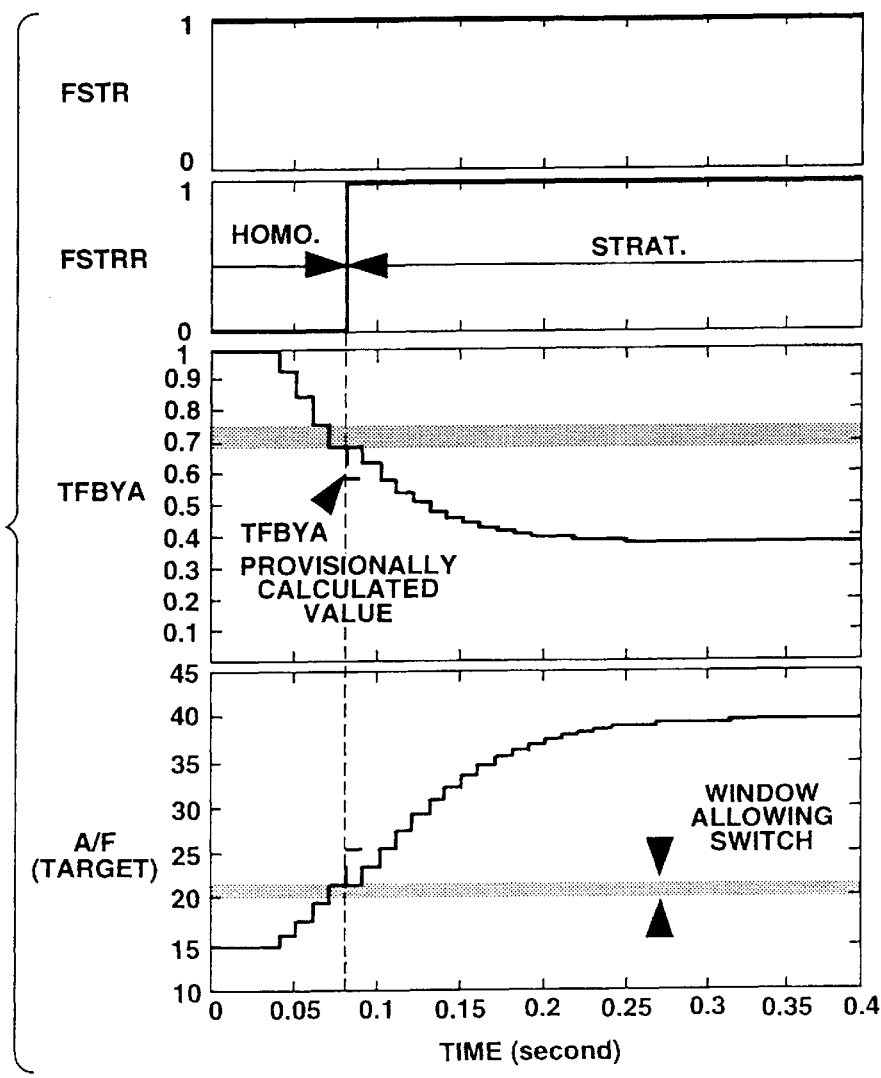
FIG. 21 graphs control commands and the engine response according to the present invention.

The provisional target equivalence ratio TFATMP is determined using ITAF that is given based on the determination, during the previous cycle, FSTRR(n−1) of combustion mode and compared with the reference value TEACH that is given based on FSTRR(n−1) to determine combustion mode for the current cycle. Based on the current determination of combustion mode, the final target equivalence ratio is determined. Within combustible equivalence ratio range that is common to stratified combustion and homogeneous combustion, the correction rate ITAF is switched to meet combustion mode for operation within this range and the target equivalence ratio TFBYA is varied at the controlled rate. Thus, as shown in FIG. 21, a smooth switch between the two combustion modes with little torque variation has been accomplished.

Assume now that a target equivalent ratio based on result of determination during the previous cycle of combustion mode is used as a target equivalence ratio for the current cycle. It is also assumed that this result of the previous determination of the combustion mode is used in computing a target equivalence ratio during the subsequent cycle.

Figure 22:
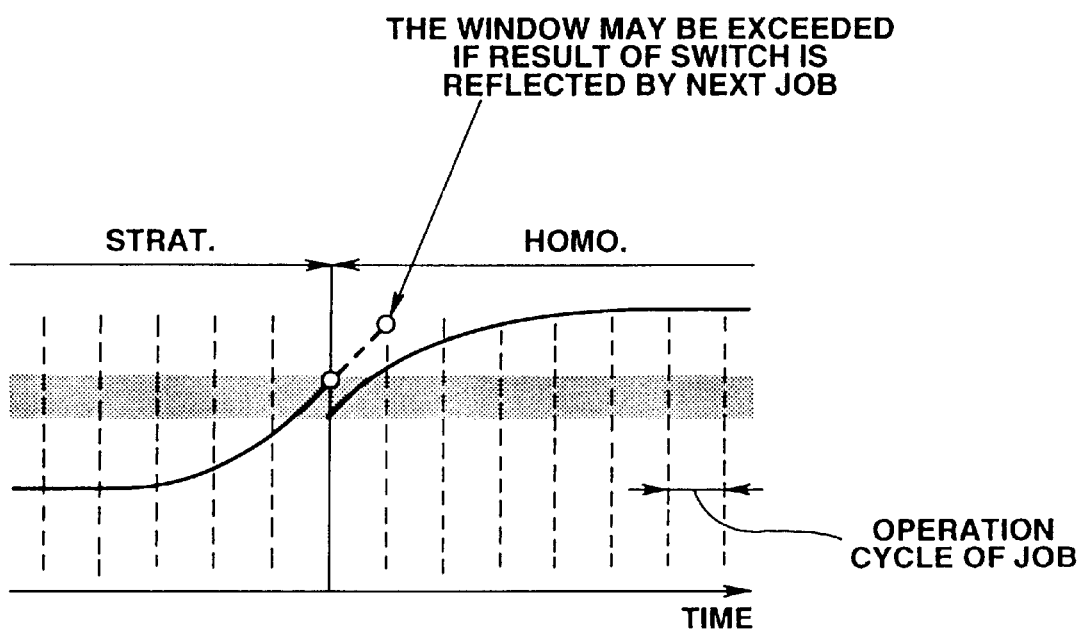
FIG. 22 graphs the engine response according to less preferred embodiment.

According to this system, the combustion mode that is selected during the previous cycle continues until the next computing cycle is completed even if, as a result of switch in determination of combustion mode, the combustion mode selected during the previous cycle may deviate from the combustible equivalence ratio range. This brings about unstable combustion as illustrated in FIG. 22. According to the system that has been described in connection with FIG. 19, occurrence of such unstable combustion can be avoided.

Figure 20:
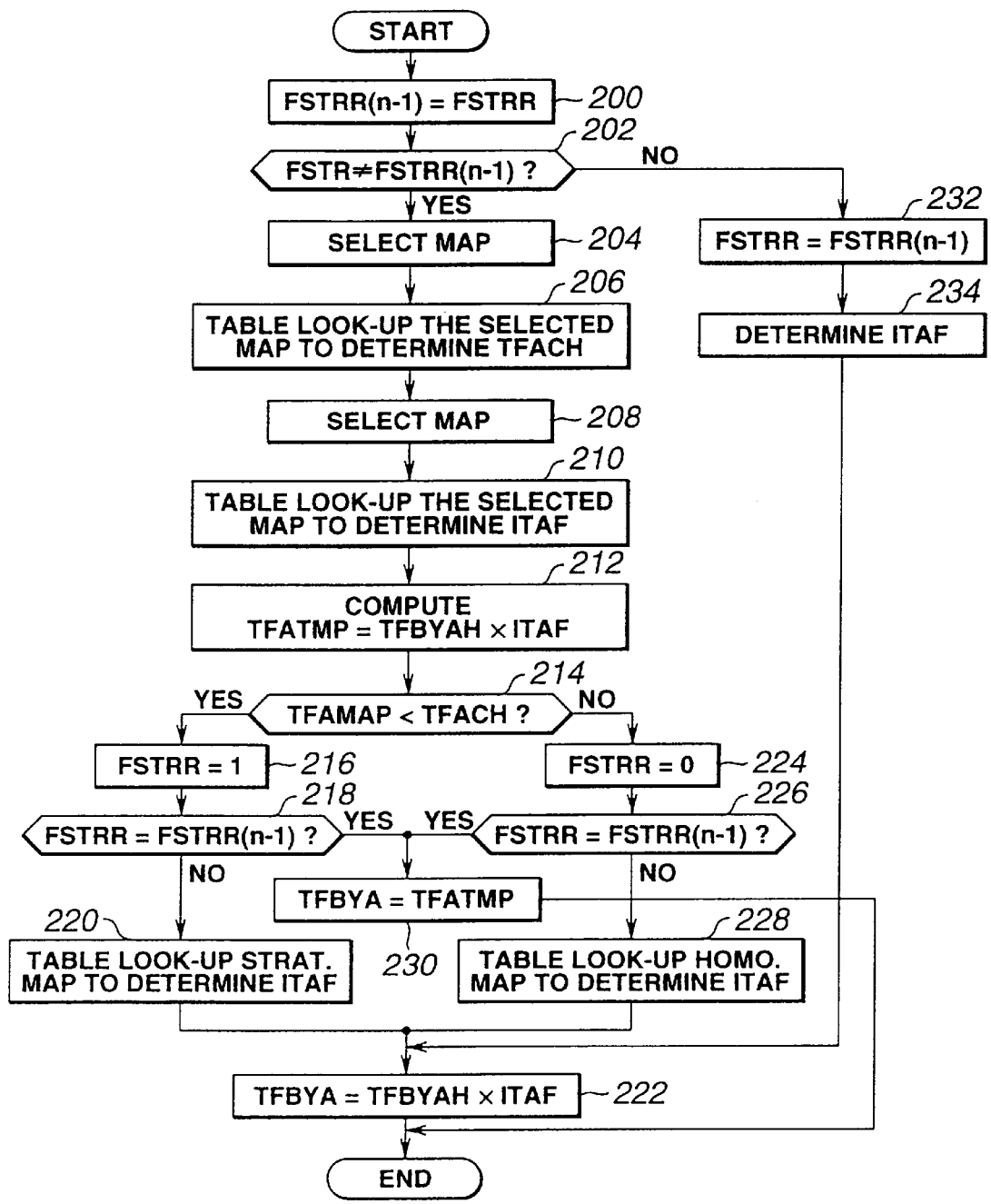
FIG. 20 is a flow chart illustrating a control routine implementing the control scheme of FIG. 19.

The flow chart of FIG. 20 illustrates a control routine of a preferred implementation according to the present invention.

In step 200, a controller 32 sets result of determination of combustion state FSTRR that was determined in the previous cycle as a previous cycle value FSTRR(n−1).

In step 202, the controller 32 determines whether or not the content of flag FSTR fails to be equal to the content of previous cycle value FSTRR(n−1).

If, in step 202, FSTR≠FSTRR(n−1), the routine proceeds to step 204. In step 204, the controller 32 selects a map that contains values of reference TFACH fit for combustion state indicated by the previous cycle value FSTRR(n−1) that results in the previous cycle.

In the next step 206, the controller 32 performs a table look-up operation of the selected map to determine TFACH. Then, the routine proceeds to step 208.

In step 208, the controller 32 selects a map that contains values of combustion efficiency correction rate ITAF fit for combustion state indicated by the previous cycle value FSTRR(n−1) that results in the previous cycle.

In step 210, the controller 32 performs a table look-up operation of the selected map to determine combustion efficiency correction rate ITAF.

In the next step 212, the controller 32 determines provisional target equivalent ratio TFATMP as the product of TFBYAH and ITAF. TFBYAH contains phase delayed correction value of basic target equivalent ratio TFBYAB. Then, the routine proceeds to step 214.

In step 214, the controller 32 determines whether or not the provisional target equivalence ratio TFATMP is less than the reference TFACH.

If, in step 214, TFATMP<TFACH, the routine proceeds to step 216. In step 216, the controller 32 sets the combustion mode flag FSTRR equal to 1, reflecting the determination that combustion mode is stratified charge combustion. Then, the routine proceeds to step 218.

In step 218, the controller 32 determines whether or not the current content of FSTRR is the same as the previously determined content FSTRR(n−1) of FSTRR.

If, in step 218, this is not the case, i.e., FSTRR≠FSTRR (n−1), the routine proceeds to step 220. In step 220, the controller 32 performs a table look-up operation of a map containing values of combustion coefficient rate ITFA for stratified combustion to determine ITFA for the stratified combustion. Then, the routine proceeds to step 222.

In step 222, the controller 32 determines target equivalence ratio TFBYA for transient between combustion modes by calculating the product of TFBYAH and newly set ITFA.

If, in step 214, TFATMP≧TFACH, the controller 32 resets FSTRR (=0) in step 224, reflecting determination that combustion mode should be homogeneous combustion. In the next step 226, the controller 32 determines whether or not the current content of FSTRR is the same as the previously determined content FSTRR(n−1) of FSTRR.

If, in step 226, this is not the case, i.e., FSTRR≠FSTRR (n−1), the routine proceeds to step 228. In step 228, the controller 32 performs a table look-up operation of a map containing values of combustion coefficient rate ITFA for homogeneous combustion to determine ITFA for the homogeneous combustion. Then, the routine proceeds to step 222.

If, in step 218 or 226, FSTRR=FSTRR(n−1), the routine proceeds to step 230. In step 230, the controller 32 sets the provisional target equivalence ratio TFATMP as target equivalence ratio TFBYA.

If, in step 202, the controller 32 determines that FSTR=FSTRR(n−1), the routine proceeds to step 232. In step 232, the controller 32 sets FSTRR(n−1) as FSTRR. In the next step 234, the controller 32 determines ITAF for the combustion mode indicated by FSTRR(n−1). Then, the routine proceeds to step 222 where the target equivalent ratio TFBYA is determined using the ITAF.

Intake air quantity control using the basic target equivalence ratio TFBYAB and fuel injection quantity control using the delayed target equivalence ratio TFBYAH are explained.

Referring back to FIG. 19, engine speed Ne and target engine torque tTe are used as the inputs to a base target intake air quantity generator 190. The engine torque tTe may be replaced with accelerator pedal position APS. This generator 190 includes a map including values of base target intake air quantity tTP against values of Ne and values of tTe. The base target intake air quantity tTP is equivalent to intake air quantity that provides combustible charge in a cylinder having the stoichiometry or base equivalent ratio. As the value of tTP, a basic fuel injection amount (pulse width) that corresponds to intake air quantity admitted to a cylinder during its intake stroke is used. The intake air quantity that is admitted into the cylinder during its intake stroke, or intake air quantity detected by airflow meter 38 per unit is an alternate. The generator 190 uses the inputs thereto in performing a table look-up operation of the map to determine tTP.

The output tTP of the generator 190 and the output TFBYA of the basic target equivalence ratio generator 170 are used as the inputs to a target intake air quantity generator 192. The output ITAF of the combustion efficiency correction rate generator 174 is also used as the input to the generator 192. The generator 170 computes a target intake air quantity tTP' corresponding to basic target equivalence ratio TFBYA by calculating the following equation, $$tTP'=tTP/(TFBYA \times ITAF) \tag{9}$$

The target intake air quantity tTP' may be approximated by a ratio resulting from dividing the base target intake air quantity tTP by the basic target equivalence ratio TFBYAB. However, values of base equivalence ratio have different values of basic target equivalence ratio TFBYAB with different values of combustion efficiency, and different values of required fuel quantity. This may be coped with by carrying out correction in accordance with combustion efficiency. This correction as expressed by the above equation (9) gives a target intake air quantity tTP' that satisfies both target torque and target equivalence ratio.

The output tTP' of the generator 192 and the engine speed Ne are used as the inputs to a target throttle generator 194. This generator 194 computes a target throttle valve opening degree or position tTPS based on the inputs tTP' and tTPS. With the throttle valve 46 being adjusted to the target throttle position tTPS, the target intake air quantity tTP' is given.

The output tTPS of the generator 192 is input into a throttle actuator 48, which adjusts the throttle valve 46 to the throttle opening degree indicated by tTPS.

Airflow rate Q detected at an airflow meter 38 and engine speed Ne are used as the inputs to a basic fuel injection pulse width generator 196. This generator 196 computes a basic fuel injection pulse width TP, which corresponds to an intake air quantity admitted to a cylinder during its intake stroke at stoichiometry (base equivalence ratio).

The output TP of the generator 196 and the output TFBYAH of the delay correcting section 172 are used as the inputs to a fuel injection pulse generator 198. This generator 198 computes a product of TP and TFBYAH to give effective fuel injection pulse width TE, and a sum of TE and TS to give a final fuel injection pulse width TI. TS indicate an invalid pulse width corresponding to the vehicle battery voltage.

The output TI of the generator 198 is input to a control loop for a fuel injector 30. The control loop gives a fuel injection pulse with the width of TI to the fuel injector 30 to open same for injection of fuel quantity into the cylinder, thereby to create combustible charge with a target air fuel ratio.

From the preceding description in connection with FIGS. 19 and 20, it is now appreciated that the requested engine torque is produced, with the target air fuel ratio as well as exhaust gas purification being maintained, by adjusting intake air quantity and fuel injection quantity to their target values, respectively. Besides, a smooth shift over transient period between stratified combustion and homogeneous combustion is provided owing to a gradual change in target equivalence ratio.

The whole contents of disclosure of Japanese Patent Applications Nos. 9-178278, filed Jul. 3, 1997; 9-200430, filed Jul. 25, 1997; and 9-144918, filed Jun. 3, 1997 are hereby incorporated by reference.

What is claimed is:

1. An engine comprising:
    a combustion chamber;
    an air intake passageway leading toward said combustion chamber;
    a throttle valve within said air intake passageway;
    a fuel injector communicating with said combustion chamber;
    a throttle controller operable in response to an intake air control command to move said throttle valve;
    a fuel controller operable in response to a fuel control command to open said fuel injector for injection of fuel into said combustion chamber; and
    an engine controller for generating said intake air control command and said fuel control command,
    said engine controller being operable to determine a target equivalence ratio for detected operating state of the engine,
    said engine controller being operable to control a change between stratified charge combustion and homogeneous charge combustion,
    said engine controller being operable to delay said target equivalence ratio, and
    said engine controller being operable to determine said fuel control command in response to said delayed target equivalence ratio.

2. An engine as claimed in claim 1, wherein
    said engine controller is operable to determine combustion efficiencies, including a first combustion efficiency and a second combustion efficiency, for stratified charge combustion and homogeneous charge combustion, respectively, and
    said engine controller is operable to correct said target equivalence ratio with one of said combustion efficiencies.

3. An engine as claimed in claim 2, wherein
said engine controller is operable to correct said target equivalence ratio with said first combustion efficiency,
said engine controller is operable to delay said target equivalence ratio as corrected, and
said engine controller is operable to correct said target equivalence ratio as corrected with said second combustion efficiency.

4. An engine as claimed in claim 3, wherein
said engine controller is operable to produce a combustion mode request command, which has first and second levels corresponding to stratified charge combustion mode and homogeneous charge combustion mode, respectively, and
said engine controller is operable to change levels of said first combustion efficiency in response to a change between said first and second levels of said combustion mode request command.

5. An engine as claimed in claim 4, wherein
said engine controller is operable to determine said first combustion efficiency using said target equivalence ratio as a parameter.

6. An engine as claimed in claim 3, wherein
said engine controller is operable to determine whether stratified charge combustion or homogeneous charge combustion continues, and
said engine controller is operable to change levels of said second combustion efficiency in response to a change between determination for stratified charge combustion and determination for homogeneous charge combustion.

7. An engine as claimed in claim 6, wherein
said engine controller is operable to change between determination for stratified charge combustion and determination for homogeneous charge combustion upon determination based on said target equivalence ratio as corrected with said first combustion efficiency, as delayed and as corrected with said second combustion efficiency after occurrence of a change between said first and second levels of said combustion mode request command.

8. An engine as claimed in claim 5, wherein
said engine controller is operable to determine said second combustion efficiency using, as a parameter, said target equivalence ratio as corrected with said first combustion efficiency and as delayed.

9. An engine as claimed in claim 8, wherein
said engine controller is operable to use exhaust gas recirculation rate as a parameter in determining said first and second combustion efficiencies.

10. An engine as claimed in claim 2, including
an accelerator pedal sensor for detection of the accelerator pedal position manually operable by an operator;
a crankshaft angle sensor for detection of the engine speed; and
an airflow meter for detection of intake air quantity admitted to said combustion chamber;
and wherein
said engine controller is operable to determine a target intake air quantity,
said engine controller is operable to determine a target throttle opening degree based on said determined target intake air quantity and detected engine speed,
said engine controller is operable to determine a basic fuel injection quantity based on the detected intake air quantity and engine speed,
said engine controller is operable to determine a final fuel injection quantity based on said determined basic fuel injection quantity and said target equivalence ratio as corrected,
said engine controller is operable to apply said target throttle opening degree as said intake air control command to said throttle controller, and
said engine controller is operable to apply said final fuel injection quantity as said fuel control command to said fuel controller.

11. An engine as claimed in claim 10, wherein
said engine controller is operable to determine the target intake air quantity, which corresponds to target air fuel ratio, based on target engine torque and the engine speed.

12. An engine as claimed in claim 11, wherein
said engine controller is operable to determine said target engine torque based on the accelerator pedal position and the engine speed.

13. An engine as claimed in claim 11, wherein
said engine controller is operable to determine said target engine torque in response to external instruction.

14. An engine as claimed in claim 10, wherein
said engine controller is operable to determine base target intake air quantity, which corresponds to a predetermined base air fuel ratio, and
said engine controller is operable to correct said base target intake air quantity to determine said target intake air quantity, which corresponds to target air fuel ratio.

15. An engine as claimed in claim 14, wherein
said engine controller is operable to determine said base target intake air quantity based on the detected accelerator pedal position and engine speed,
said engine controller is operable to determine target equivalence ratio, and
said engine controller is operable to determine said target intake air quantity as a function of said base target intake air quantity and said target equivalence ratio.

16. An engine as claimed in claim 1, including
a spark plug for production of spark within said combustion chamber,
and wherein
said fuel injector is arranged to directly inject fuel into said combustion chamber.

17. An engine as claimed in claim 1, wherein
said engine controller is operable to determine a target equivalence ratio,
said engine controller is operable to correct said target equivalence ratio with a first combustion efficiency,
said engine controller is operable to delay said target equivalence ratio as corrected by an amount of delay between throttle control command and throttle valve response,
said engine controller is operable to correct said delayed target equivalence ratio with a second combustion efficiency,
said engine controller is operable to correct basic fuel quantity with said delayed target equivalence ratio as corrected with said second combustion efficiency to give final fuel injection quantity, and
said engine controller is operable to apply said final fuel injection quantity as said fuel control command to said fuel controller.

18. An engine as claimed in claim 1, wherein said engine controller is operable to delay said target equivalence ratio by an amount as much as an intake air admission delay.

19. An engine as claimed in claim 1, wherein said engine controller is operable to determine target intake air quantity, said engine controller is operable to determine target throttle opening degree based on said target intake air quantity, said engine controller is operable to apply said target throttle opening degree as said intake air control command to said throttle controller, and said engine controller is operable to delay said target equivalence ratio by an amount as much as an operation delay between throttle command and throttle response.

20. An engine as claimed in claim 19, wherein said engine controller is operable to correct said target equivalence ratio based on response characteristic of the throttle controller and throttle valve with a correction coefficient that reflects a phase delay between command and response of the throttle valve.

21. An engine as claimed in claim 20, wherein said engine controller is operable to adjust said correction coefficient based on battery voltage.

22. An engine as claimed in claim 20, wherein said engine controller is operable to adjust said correction coefficient based on state of the throttle valve.

23. An engine as claimed in claim 22, wherein said state of the throttle valve is represented by direction in which the throttle valve is moving and current opening degree of the throttle valve.

24. An engine as claimed in claim 19, wherein said operation delay includes a dead time.

25. An engine as claimed in claim 19, wherein said operation delay includes a first order delay.

26. A control system for an internal combustion engine operable on stratified charge combustion or homogeneous charge combustion, comprising:

a basic target equivalence ratio generator for generating a basic target equivalence ratio for detected operating state of the engine;

a transfer unit operable to delay said basic target equivalence ratio;

a provisional target equivalence ratio generator for generating a provisional target equivalence ratio as determined as a function of said delayed basic target equivalence ratio that was determined during the previous operation cycle;

a comparator for determining whether or not a change between stratified charge combustion and homogeneous charge combustion has occurred based on said provisional target equivalence ratio; and a target equivalence ratio generator for generating a target equivalence ratio for the current operation cycle in response to the result of determination whether or not change between stratified charge combustion and homogeneous charge combustion has occurred.

27. A control system as claimed in claim 26, wherein said transfer includes a delay that is operable to provide a first order delay.

28. A control system as claimed in claim 27, wherein said transfer includes a combustion efficiency correction rate generator for generating combustion efficiency correction rate that is variable in response to the result of said determination at said comparator.

29. A control system as claimed in claim 28, wherein said provisional target equivalence ratio generator determines provisional target equivalence ratio based on said basic target equivalence ratio and combustion efficiency correction rate that were determined in the previous operation cycle.

30. A control system as claimed in claim 26, wherein said comparator compares said provisional target equivalence ratio with a reference.

31. A control system as claimed in claim 30, including a reference generator for generating the reference that is variable in response to the result of determination at said comparator.

32. A control system as claimed in claim 28, wherein said target equivalence ratio generator uses said provisional target equivalence ratio as said target equivalence ratio if the result of determination at said comparator remains unaltered for two consecutive operation cycles, and corrects said delayed basic target equivalence ratio with a new combustion efficiency correction rate determined during the current operation cycle and sets the result as said target equivalence ratio.

* * * * *